(12) United States Patent
Roller et al.

(10) Patent No.: US 8,399,554 B2
(45) Date of Patent: *Mar. 19, 2013

(54) USE OF HIGHLY BRANCHED POLYMERS IN POLYMER DISPERSIONS FOR GLOSS COLOURS

(75) Inventors: Sebastian Roller, Mannheim (DE); Bernd Bruchmann, Freinsheim (DE); Rolf Dersch, Neustadt (DE); Daniel Schoenfelder, Brussels (BE)

(73) Assignee: BASF SE, Ludwigshafen (DE)

( * ) Notice: Subject to any disclaimer, the term of this patent is extended or adjusted under 35 U.S.C. 154(b) by 319 days.

This patent is subject to a terminal disclaimer.

(21) Appl. No.: 12/741,244

(22) PCT Filed: Nov. 19, 2008

(86) PCT No.: PCT/EP2008/065861
§ 371 (c)(1),
(2), (4) Date: May 4, 2010

(87) PCT Pub. No.: WO2009/065868
PCT Pub. Date: May 28, 2009

(65) Prior Publication Data
US 2010/0267886 A1    Oct. 21, 2010

(30) Foreign Application Priority Data

Nov. 19, 2007 (EP) ..................... 07121034
Dec. 14, 2007 (EP) ..................... 07150041

(51) Int. Cl.
*C09B 67/00* (2006.01)
*C08G 18/42* (2006.01)

(52) U.S. Cl. ........................ 524/502; 524/500
(58) Field of Classification Search .................. 524/502
See application file for complete search history.

(56) References Cited

U.S. PATENT DOCUMENTS

| | | | |
|---|---|---|---|
| 4,226,007 A | 10/1980 | Duenser et al. | |
| 4,269,749 A | 5/1981 | Marriott et al. | |
| 4,733,005 A | 3/1988 | Schmidt et al. | |
| 5,159,047 A | 10/1992 | Simms | |
| 6,096,801 A | 8/2000 | Vincent et al. | |
| 6,150,468 A | 11/2000 | Schoenberg et al. | |
| 6,291,021 B1 * | 9/2001 | Morita et al. | 427/387 |
| 6,392,006 B1 | 5/2002 | Van Benthem et al. | |
| 6,420,479 B1 * | 7/2002 | Phan et al. | 524/800 |
| 7,186,771 B2 * | 3/2007 | Haggman et al. | 524/500 |
| 7,649,074 B2 * | 1/2010 | Bruchmann et al. | 528/196 |
| 2002/0161113 A1 | 10/2002 | Dvornic et al. | |
| 2003/0069370 A1 * | 4/2003 | Dvornic et al. | 525/474 |
| 2008/0262145 A1 | 10/2008 | Roschmann et al. | |
| 2008/0275165 A1 * | 11/2008 | Balk et al. | 523/501 |
| 2008/0312384 A1 | 12/2008 | Bruchmann et al. | |
| 2009/0048416 A1 | 2/2009 | Bruchmann et al. | |
| 2009/0061171 A1 | 3/2009 | Stein et al. | |
| 2009/0093589 A1 | 4/2009 | Bruchmann et al. | |
| 2009/0099319 A1 | 4/2009 | Stumbe et al. | |
| 2009/0209701 A1 | 8/2009 | Steinmetz et al. | |
| 2009/0281274 A1 | 11/2009 | Bruchmann et al. | |
| 2009/0318607 A1 | 12/2009 | Schutte et al. | |
| 2010/0028582 A1 | 2/2010 | Joch et al. | |
| 2010/0035065 A1 | 2/2010 | Terrenoire et al. | |
| 2010/0036008 A1 | 2/2010 | Bruchmann et al. | |
| 2010/0048813 A1 | 2/2010 | Clauss et al. | |
| 2010/0055446 A1 | 3/2010 | Seyffer et al. | |
| 2010/0090174 A1 | 4/2010 | Weber et al. | |
| 2010/0105943 A1 | 4/2010 | Schoenfelder et al. | |
| 2010/0173144 A1 | 7/2010 | Schuette et al. | |

FOREIGN PATENT DOCUMENTS

| | | |
|---|---|---|
| DE | 2 061 213 | 6/1971 |
| DE | 2 207 209 | 10/1972 |
| DE | 27 22 097 | 11/1978 |
| DE | 199 47 631 | 6/2000 |
| DE | 199 04 444 | 8/2000 |
| DE | 100 13 187 | 10/2001 |
| DE | 100 30 869 | 1/2002 |
| DE | 101 38 216 | 2/2003 |
| DE | 101 47 712 | 4/2003 |
| DE | 101 63 163 | 7/2003 |
| DE | 102 11 664 | 10/2003 |
| DE | 102 19 508 | 11/2003 |
| DE | 102 40 817 | 3/2004 |
| EP | 0 802 215 | 10/1997 |
| EP | 1 006 165 | 6/2000 |
| EP | 1 026 185 | 8/2000 |
| EP | 1036106 | 9/2000 |
| EP | 1 095 953 | 5/2001 |
| EP | 1 219 650 | 7/2002 |
| WO | 93 25588 | 12/1993 |
| WO | 97 02304 | 1/1997 |
| WO | 99 25780 | 5/1999 |

(Continued)

OTHER PUBLICATIONS

Manczyk, K. et al., "Highly Branched High Solids Alkyd Resins", Progress in Organic Coatings, vol. 44, pp. 99-109 (2002).
Bat, E. et al., "Synthesis and Characterization of Hyperbranched and Air Drying Fatty Acid Based Resins", Progress in Organic Coatings, vol. 55, pp. 330-336 (2006).
U.S. Appl. No. 12/602,802, filed Jul. 6, 2010, Peretolchin, et al.
U.S. Appl. No. 12/601,293, filed Nov. 23, 2009, Balk, et al.
U.S. Appl. No. 12/673,180, filed Feb. 12, 2010, Mettlach, et al.
U.S. Appl. No. 12/680,210, filed Mar. 26, 2010, Feuerhake, et al.
U.S. Appl. No. 12/682,019, filed Apr. 7, 2010, Bruchmann, et al.
U.S. Appl. No. 12/682,223, filed Apr. 8, 2010, Bruchmann, et al.
U.S. Appl. No. 12/743,436, filed May 18, 2010, Terrenoire, et al.

*Primary Examiner* — David W Wu
*Assistant Examiner* — Hui Chin
(74) *Attorney, Agent, or Firm* — Oblon, Spivak, McClelland, Maier & Neustadt, L.L.P.

(57) ABSTRACT

The present invention relates to a method of producing coatings with increased gloss, to aqueous coating materials for such a method, and to the use of highly branched polymers as an additive for aqueous polymer dispersions for coating materials that lead to coatings having increased gloss.

22 Claims, No Drawings

FOREIGN PATENT DOCUMENTS

| | | |
|---|---|---|
| WO | 00 29495 | 5/2000 |
| WO | 00 56802 | 9/2000 |
| WO | 01 46296 | 6/2001 |
| WO | 01 96411 | 12/2001 |
| WO | 03 062306 | 7/2003 |
| WO | 03 066702 | 8/2003 |
| WO | 2004 016700 | 2/2004 |
| WO | 2004 016701 | 2/2004 |
| WO | 2004 037928 | 5/2004 |
| WO | 2004 072125 | 8/2004 |
| WO | 2005 003186 | 1/2005 |
| WO | 2005 007726 | 1/2005 |
| WO | 2005 026234 | 3/2005 |
| WO | 2005 044897 | 5/2005 |
| WO | 2005 075541 | 8/2005 |
| WO | 2006 018125 | 2/2006 |
| WO | 2006 087227 | 8/2006 |
| WO | 2006 089940 | 8/2006 |

* cited by examiner

USE OF HIGHLY BRANCHED POLYMERS IN POLYMER DISPERSIONS FOR GLOSS COLOURS

The present invention relates to a method of producing coatings with increased gloss, to aqueous coating materials for such a method, and to the use of highly branched polymers as an additive for aqueous polymer dispersions for coating materials that lead to coatings having increased gloss.

Paints are typically divided into three categories according to their capacity to reflect light:
1. flat paints, with a specular gloss of less than 15% reflectance;
2. semigloss paints, with a specular gloss of about 35% to 50% reflectance; and
3. high-gloss paints, with a specular gloss of >70% reflectance;

based in each case on light with an angle of incidence of 60°.

The quality of unpigmented and especially pigmented coating materials based on aqueous polymer dispersions depends critically on the gloss of the resultant coatings. Consequently there has been no lack of attempts to improve the gloss by means of suitable additions. In many cases, however, these additions have the disadvantage of still exhibiting a certain volatility, which impacts negatively on the VOC of the resultant coatings.

WO 00/29495 describes a coating material which comprises a solvent, an alkyd resin (polyester resin), and a star polymer. The star polymers in such materials serve as modifiers for improving the performance properties of the coating materials, such as for achieving a lower viscosity, for example. They derive from polyfunctional thiols which contain at least three vinylically unsaturated side chains.

WO 01/96411 describes amphiphilic star polymers which have a mercaptan-based core from which there proceed at least three polymer arms, and also describes the use of these star polymers to stabilize aqueous polymer dispersions.

WO 2004/016700 describes a water-based copolymer dispersion which is obtainable by copolymerization using at least one dendritic polymer which is functionalized with alkylene groups. The resulting copolymer dispersions are notable for improved blocking properties. The document does not teach the addition of a highly branched polymer to an aqueous polymer dispersion for the purpose thereby of providing aqueous coating materials that lead to coatings with increased gloss.

WO 2004/016701 describes an aqueous homopolymer or copolymer dispersion, obtainable by means of emulsion polymerization, where an alkenyl-functionalized dendrimer is used as an addition. The composition may be used as a binder for coatings. Its use for increasing the gloss is not disclosed.

WO 2004/037928 describes an air-drying aqueous resin composition composed of a fatty acid-functionalized hyperbranched polymer which dries in the air, a nonamphiphilic alkyd resin, a dryer, and a stabilizer.

WO 2005/003186 describes a process for preparing aqueous polymer dispersions based on copolymers which incorporate at least one hydrophobic allyl, vinyl, maleic or diene monomer, the polymerization taking place in the presence of at least one dendritic polymer. The dendritic polymer in this system enables the use even of strongly hydrophobic monomers having a water solubility of less than 0.001 g/l for the emulsion polymerization. The use of such dendritic polymers as an addition to polymer dispersions for the purpose thereby of providing aqueous coating materials that lead to coatings with increased gloss is not described.

EP 1006165 A2 describes a coating composition comprising a vinyl polymer with appended carbosiloxane dendrimer groups. These groups are introduced by free-radical copolymerization with vinyl-functionalized carbosiloxane dendrimers. The coating composition serves for the construction industry, buildings, automobiles, etc. The coating is resistant to weather, water, and icing, and exhibits good gloss maintenance and water repulsion.

K. Manczyk, P. Szewczyk describe, in Prog. Org. Coat. 2002, 44, 99-109, highly branched high-solids alkyd resins. These resins may be based both on star-shaped structures and on hyperbranched structures. As the degree of branching went up, the drying of these alkyd resins became quicker. Besides other performance properties, the gloss is reported as well. The document, however, does not reveal the suitability of hyperbranched polymers as a specific addition for gloss improvement. A comparable disclosure content is that of the article by E. Bat, G. Gündüz, D. Kisakürek, and I. M. Akhmedoc in Prog. Org. Coat. 2006, 55, 330-336.

It was an object of the present invention to provide aqueous polymer dispersions for use in paints with increased gloss. The dispersions ought especially to serve to increase the gloss of gloss paints based on acrylate dispersions.

Surprisingly it has been found that this object is achieved through the use of highly branched polymers in aqueous polymer dispersions for coating materials.

The invention first provides, therefore, a method of producing a coating with increased gloss by applying to a substrate an aqueous coating material which comprises an aqueous polymer dispersion PD) and a highly branched polymer.

The invention further provides coating materials in the form of an aqueous composition comprising:
at least one dispersion as defined below which comprises a highly branched polymer as an additive,
if appropriate, at least one inorganic filler and/or inorganic pigment,
typical auxiliaries, and
water to 100% by weight.

The invention further provides a method increasing the gloss of a coating based on an aqueous polymer dispersion PD), which is obtainable by free-radical emulsion polymerization of at least one $\alpha,\beta$-ethylenically unsaturated monomer M), by addition of at least one highly branched polymer.

The addition of the highly branched polymers to the polymer dispersion PD) may be made before and/or during and/or after the emulsion polymerization for the preparation of PD). Addition after the emulsion polymerization also comprises addition as part of the formulation of a product that comprises an emulsion polymer based on at least one $\alpha,\beta$-ethylenically unsaturated monomer M). For that purpose at least one highly branched polymer as defined below may be added as an additive to a paint. The invention further provides, therefore, for the use of at least one highly branched polymer as an additive for a product that comprises an emulsion polymer based on at least one $\alpha,\beta$-ethylenically unsaturated monomer M), as defined below, to increase the gloss of the coatings produced therefrom.

The invention further provides for the use of highly branched polymers as defined below as an additive for aqueous coating materials which comprise an aqueous emulsion polymer PD) for increasing the gloss of the coatings produced therefrom.

The invention further provides for the use of an aqueous polymer dispersion PD) which comprises a highly branched polymer as an additive as a component in transparent varnishes and in high-gloss paints.

The gloss of the paint can be determined by DIN 67530. The paint is applied with a slot width of 240 μm to a glass plate and is dried at room temperature for 72 hours. The test specimen is inserted into a calibrated reflectometer, and, with a defined incident angle, a record is made of the extent to which the light returned has been reflected or scattered. The reflectometer value determined is a measure of the gloss (the higher the value, the higher the gloss).

The gloss of semigloss paints is preferably greater than 15 at 60°. The gloss of high-gloss paints based on the coating materials of the invention is preferably greater than 60 at 20°. The gloss of high-gloss paints is preferably greater than 80 at 60°.

The polymer dispersion PD) used in accordance with the invention comprises preferably 0.1 to 15% by weight, more preferably 0.5% to 10% by weight, based on the total weight of the polymer dispersion, of at least one highly branched polymer. Typical amounts of the highly branched polymer are situated, for example, within a range from 1% to 5% by weight.

The inventive use of the highly branched polymers is accompanied by at least one of the following advantages:
  increase in the gloss of coating materials (paints), especially of gloss paints based on acrylate dispersions,
  high compatibility of the highly branched polymers employed with a multiplicity of dispersions,
  at least partial avoidance of additives that increase the VOC content of the dispersions.

Added in accordance with the invention to the polymer dispersion PD) is at least one highly branched polymer. The expression "highly branched polymers" refers for the purposes of this invention, quite generally, to polymers which are distinguished by a strongly branched structure and a high functionality. For the general definition of highly branched polymers, reference is also made to P. J. Flory, J. Am. Chem. Soc. 1952, 74, 2718, and H. Frey et al., Chem. Eur. J. 2000, 6, No. 14, 2499 (where they are referred to, in deviation from the definition chosen here as "hyperbranched polymers").

The highly branched polymers in the sense of the invention include star polymers, dendrimers, arborols, and different highly branched polymers, such as, specifically, hyperbranched polymers.

Star polymers are polymers in which three or more chains extend from a center. This center may be a single atom or a group of atoms.

Dendrimers derive structurally from the star polymers, but with star branching in each of the individual chains. Dendrimers are formed starting from small molecules by means of a continually repeating reaction sequence resulting in ever higher numbers of branches, at whose ends there are in each case functional groups which, in turn, are a starting point for further branches. Hence the number of monomer end groups grows exponentially with each reaction step, ultimately resulting in a tree structure which in the ideal case is spherical. A characteristic feature of the dendrimers is the number of reaction stages (generations) carried out for the purpose of their synthesis. On the basis of their uniform construction (in the ideal case, all of the branches comprise exactly the same number of monomer units), dendrimers are substantially monodisperse, i.e., they generally have a defined molar mass.

Both molecularly and structurally uniform highly branched polymers will also be referred to in common below as dendrimers.

"Hyperbranched polymers" in the context of this invention are highly branched polymers which, in contradistinction to the abovementioned dendrimers, are both molecularly and structurally nonuniform. They have side chains and/or side branches which differ in length and branching and also in their molar mass distribution (polydispersity).

The highly branched polymers in accordance with the invention preferably have a degree of branching (DB) per molecule of 10% to 100%, more preferably 10% to 90%, and more particularly 10% to 80%. The degree of branching, DB is defined by $DB(\%)=(T+Z)/(T+Z+L)\times 100$, where T is the average number of terminally attached monomer units,
Z is the average number of branch-forming monomer units,
L is the average number of linearly attached monomer units.

Dendrimers generally have a degree of branching DB of at least 99%, especially 99.9% to 100%.

Hyperbranched polymers preferably have a degree of branching DB of 10% to 95%, more preferably 25% to 90%, and more particularly 30% to 80%.

In order to achieve advantageous gloss properties it is possible to use not only structurally and molecularly uniform dendrimers but also hyperbranched polymers. Hyperbranched polymers, however, are generally easier and hence more economic to prepare than dendrimers. Thus, for example, the preparation of the monodisperse dendrimers is complicated by the fact that, at each linking step, protective groups are introduced and have to be removed again, and, before the beginning of each new growth stage, intense cleaning operations are needed, which is why dendrimers can typically be prepared only on a laboratory scale. Hyperbranched polymers, with their molecular weight distribution, can also have an advantageous effect on the viscosity properties of the dispersions that are modified with them. Hyperbranched polymers, moreover, have a more flexible structure than the dendrimers.

Suitability as highly branched polymers is possessed in principle by those which are obtainable by polycondensation, by polyaddition or by addition polymerization of ethylenically unsaturated compounds. Preference is given to polycondensates. By polycondensation is meant the repeated chemical reaction of functional compounds with suitable reactive compounds, with elimination of compounds of low molecular mass, such as water, alcohol, HCl, etc. By polyaddition is meant the repeated chemical reaction of functional compounds with suitable reactive compounds, without elimination of compounds of low molecular mass.

Suitability is possessed by polymers which contain functional groups selected preferably from ether groups, ester groups, carbonate groups, amino groups, amide groups, urethane groups, and urea groups.

As polymers it is possible more particularly to use polycarbonates, polyesters, polyethers, polyurethanes, polyureas, polyamines, and polyamides, and also their hybrid forms, such as, for example, poly(ureaurethanes), poly(etheramines), poly(esteramines), poly(etheramides), poly(esteramides), poly(amidoamines), poly(estercarbonates), poly(ethercarbonates), poly(etheresters), poly(etherestercarbonates), etc.

Preferred hyperbranched polymers are those based on ethers, amines, esters, carbonates, amides, and also their hybrid forms, such as, for example, esteramides, amidoamines, estercarbonates, ethercarbonates, etheresters, etherestercarbonates, ureaurethanes, etc.

As hyperbranched polymers it is possible more particularly to use hyperbranched polycarbonates, hyperbranched poly(ethercarbonates), hyperbranched poly(etheresters), hyperbranched poly(etherestercarbonates), hyperbranched polyester, hyperbranched polyethers, hyperbranched polyurethanes, hyperbranched poly(ureaurethanes), hyperbranched polyureas, hyperbranched polyamines, hyperbranched polyamides, hyperbranched poly(etheramine)s, hyperbranched poly(esteramine)s, hyperbranched poly(etheramide)s, hyperbranched poly(esteramide)s, and mixtures thereof. Once specific version of hyperbranched polymers are hyperbranched polycarbonates. Another specific version of hyperbranched polymers are hyperbranched polymers containing nitrogen atoms, especially polyurethanes, polyureas, polyamines, polyamides, poly(esteramide)s, and poly(esteramine)s.

As highly branched polymer it is preferred to use a hyperbranched polycarbonate, poly(ethercarbonate), poly(estercarbonate) or poly(etherestercarbonate) or a mixture of hyperbranched polymers that comprises at least one hyperbranched polycarbonate, poly(ethercarbonate), poly(estercarbonate) or poly(etherestercarbonate).

Hyperbranched polymers suitable for the inventive use, and processes for their preparation, are described in the following documents, fully incorporated by reference:
  highly branched and especially hyperbranched polycarbonates according to WO 2005/026234,
  hyperbranched polyesters according to WO 01/46296, DE 101 63 163, DE 102 19 508 or DE 102 40 817,
  hyperbranched polyethers according to WO 03/062306, WO 00/56802, DE 102 11 664 or DE 199 47 631,
  hyperbranched polymers containing nitrogen atoms (especially polyurethanes, polyureas, polyamides, poly(esteramides), poly(esteramines), as described in WO 2006/087227,
  hyperbranched polyurethanes according to WO 97/02304 or DE 199 04 444, hyperbranched poly(ureaurethanes) according to WO97/02304 or DE 199 04 444,
  hyperbranched polyureas as described in WO 03/066702, WO 2005/044897 and WO 2005/075541,
  hyperbranched amino-containing polymers, especially poly(esteramines) according to WO 2005/007726,
  hyperbranched poly(esteramides) according to WO 99/16810 or EP 1 036 106,
  hyperbranched polyamides as described in WO 2006/018125,
  hyperbranched poly(estercarbonates) as described in WO 2006/089940.

Preferred polymers are those which have a weight-average molecular weight $M_w$ in the range from about 500 to 500 000, preferably 750 to 200 000, more particularly 1000 to 100 000. The molar mass can be determined by gel permeation chromatography with a standard, such as polymethyl methacrylate.

In the context of the present invention the expression "alkyl" comprises straight-chain and branched alkyl groups. Suitable short-chain alkyl groups are, for example, straight-chain or branched $C_1$-$C_7$ alkyl, preferably $C_1$-$C_6$ alkyl, and more preferably $C_1$-$C_4$ alkyl groups. They include more particularly methyl, ethyl, propyl, isopropyl, n-butyl, 2-butyl, sec-butyl, tert-butyl, n-pentyl, 2-pentyl, 2-methylbutyl, 3-methylbutyl, 1,2-dimethylpropyl, 1,1-dimethylpropyl, 2,2-dimethylpropyl, 1-ethylpropyl, n-hexyl, 2-hexyl, 2-methylpentyl, 3-methylpentyl, 4-methylpentyl, 1,2-dimethylbutyl, 1,3-dimethylbutyl, 2,3-dimethylbutyl, 1,1-dimethylbutyl, 2,2-dimethylbutyl, 3,3-dimethylbutyl, 1,1,2-trimethylpropyl, 1,2,2-trimethylpropyl, 1-ethylbutyl, 2-ethylbutyl, 1-ethyl-2-methylpropyl, n-heptyl, 2-heptyl, 3-heptyl, 2-ethylpentyl, 1-propylbutyl, etc. Suitable longer-chain $C_8$-$C_{30}$ alkyl groups are straight-chain or branched alkyl groups. They are preferably predominantly linear alkyl radicals, of the kind also occurring in natural or synthetic fatty acids and fatty alcohols and also oxo-process alcohols. They include, for example, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, etc. The expression "alkyl" comprises unsubstituted and substituted alkyl radicals.

The above remarks for alkyl also apply to the alkyl moieties in arylalkyl. Preferred arylalkyl radicals are benzyl and phenylethyl.

$C_8$-$C_{32}$ alkenyl in the context of the present invention stands for straight-chain and branched alkenyl groups, which may be singly, doubly or multiply unsaturated. Preference is given to $C_{10}$-$C_{20}$ alkenyl. The expression "alkenyl" comprises unsubstituted and substituted alkenyl radicals. The radicals in question are, especially, predominantly linear alkenyl radicals, of the kind which also occur in natural or synthetic fatty acids and fatty alcohols and also oxo-process alcohols. They include more particularly octenyl, nonenyl, decenyl, undecenyl, dodecenyl, tridecenyl, tetradecenyl, pentadecenyl, hexadecenyl, heptadecenyl, octadecenyl, nonadecenyl, linolyl, linolenyl, eleostearyl, and oleyl (9-octadecenyl).

The expression "alkylene" in the sense of the present invention stands for straight-chain or branched alkanediyl groups having 1 to 7 carbon atoms, such as methylene, 1,2-ethylene, 1,3-propylene, etc.

Cycloalkyl stands preferably for $C_4$-$C_8$ cycloalkyl, such as cyclobutyl, cyclopentyl, cyclohexyl, cycloheptyl or cyclooctyl.

The expression "aryl" comprises for the purposes of the present invention monocyclic or polycyclic aromatic hydrocarbon radicals which may be unsubstituted or substituted. The expression "aryl" stands preferably for phenyl, tolyl, xylyl, mesityl, duryl, naphthyl, fluorenyl, anthracenyl, phenanthrenyl or naphthyl, more preferably for phenyl or naphthyl, it being possible for these aryl groups, in the case of substitution, to carry generally 1, 2, 3, 4 or 5, preferably 1, 2 or 3, substituents.

Suitability for the synthesis of hyperbranched polymers suitable for use in the method of the invention is possessed more particularly by what are called $AB_x$ monomers. These monomers have two different functional groups, A and B, which are able to react with one another to form a link. The functional group A is present only once per molecule, and the functional group B two or more times (e.g., $AB_2$ or $AB_3$ monomers). The $AB_x$ monomers may be incorporated fully in the form of branches into the hyperbranched polymer; they may be incorporated as terminal groups, thus still having x free B groups; and they may be incorporated as linear groups having (x−1) free B groups. The hyperbranched polymers obtained have a greater or lesser number of B groups, either terminally or as side groups, depending on the degree of polymerization. Further details are found, for example, in Journal of Molecular Science, Rev. Macromol. Chem. Phys., C37(3), 555-579 (1997).

In addition to the groups that result during the synthesis of the hyperbranched structure (for example, carbonate groups in the case of hyperbranched polycarbonates; urethane and/or urea groups in the case of hyperbranched polyurethanes, and further groups originating from the reaction of isocyanate groups; amide groups in the case of hyperbranched polyamides, and so on), the hyperbranched polymers used in accordance with the invention preferably contain at least four further functional groups. The maximum number of these functional groups is generally not critical. In many cases, however, it is not more than 100. The number of functional groups is preferably 4 to 100, especially 5 to 80, and more especially 6 to 50.

The further terminal functional groups of the hyperbranched polymers used in accordance with the invention are selected for example, independently of one another, from —OC(=O)OR, —COOH, —COOR, —CONH$_2$, —CONHR, —OH, —NH$_2$, —NHR, and —SO$_3$H. Hyperbranched polymers terminated by OH, COOH and/or ROC(=O)O— groups have proven particularly advantageous.

Hyperbranched Polycarbonates

Hyperbranched polycarbonates suitable for use for increasing the gloss can be prepared, for example, by a) reacting at least one organic carbonate (A) of the general formula R$^a$OC(=O)OR$^b$ with at least one aliphatic alcohol (B) which contains at least 3 OH groups, with elimination of alcohols R$^a$OH and R$^b$OH, to give one or more condensation products (K), R$^a$ and R$^b$ each being selected independently of one another from straight-chain or branched alkyl, arylalkyl, cycloalkyl, and aryl radicals, and it also being possible for R$^a$ and R$^b$, together with the group —OC(=O)O— to which they are attached, to be a cyclic carbonate, b) intermolecularly reacting the condensation products (K) to give a high-functionality, hyperbranched polycarbonate, the proportion of the OH groups to the carbonates in the reaction mixture being chosen such that the condensation products (K) contain on average either one carbonate group and more than one OH group, or one OH group and more than one carbonate group. The radicals R$^a$ and R$^b$ may have identical or different definitions. In one specific version R$^a$ and R$^b$ have the same definitions. Preferably R$^a$ and R$^b$ are selected from C$_1$-C$_{20}$ alkyl, C$_5$-C$_7$ cycloalkyl, C$_6$-C$_{10}$ aryl, and C$_6$-C$_{10}$ aryl-C$_1$-C$_{20}$, alkyl, as defined above. R$^a$ and R$^b$ can also together be a C$_2$-C$_6$ alkylene group. With particular preference R$^a$ and R$^b$ are selected from straight-chain and branched C$_1$-C$_5$ alkyl, as defined above.

Dialkyl or diaryl carbonates can be prepared, for example, from the reaction of aliphatic, araliphatic or aromatic alcohols, preferably monoalcohols, with phosgene. Furthermore, they can also be prepared via oxidative carbonylation of the alcohols or phenols by means of CO in the presence of noble metals, oxygen or NO$_x$. Regarding preparation methods of diaryl or dialkyl carbonates, see also Ullmann's Encyclopedia of Industrial Chemistry, 6$^{th}$ Edition, 2000 Electronic Release, Wiley-VCH.

Examples of suitable carbonates encompass aliphatic or aromatic carbonates such as ethylene carbonate, 1,2- or 1,3-propylene carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, and didodecyl carbonate.

Preference is given to using aliphatic carbonates, more particularly those in which the radicals comprise 1 to 5 C atoms, such as dimethyl carbonate, diethyl carbonate, dipropyl carbonate, dibutyl carbonate or diisobutyl carbonate, for example.

The organic carbonates are reacted with at least one aliphatic alcohol (B) which contains at least 3 OH groups, or with mixtures of two or more different alcohols.

Examples of compounds having at least three OH groups are glycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, bis(trimethylolpropane), di(pentaerythritol), di-, tri- or oligoglycerols, or sugars, such as glucose, polyetherols that have a functionality of three or more and are based on alcohols with a functionality of three or more and ethylene oxide, propylene oxide or butylene oxide, or polyesterols. Particular preference is given to glycerol, trimethylolethane, trimethylolpropane, 1,2,4-butanetriol, pentaerythritol, and also their polyetherols based on ethylene oxide or propylene oxide.

These polyfunctional alcohols can also be used in a mixture of difunctional alcohols (B'), with the proviso that the average OH functionality of all of the alcohols used is together more than 2. Examples of suitable compounds having two OH groups comprise ethylene glycol, diethylene glycol, triethylene glycol, 1,2- and 1,3-propanediol, dipropylene glycol, tripropylene glycol, neopentyl glycol, 1,2-, 1,3-, and 1,4-butanediol, 1,2-, 1,3-, and 1,5-pentanediol, hexanediol, cyclopentanediol, cyclohexanediol, cyclohexanedimethanol, and difunctional polyetherols or polyesterols.

The reaction of the carbonate with the alcohol or alcohol mixture to give the high-functional hyperbranched polycarbonate used according to the invention takes place with elimination of the monofunctional alcohol or phenol from the carbonate molecule.

The high-functionality hyperbranched polycarbonates formed by the process outlined are terminated after the reaction, i.e., without further modification, with hydroxyl groups and/or with carbonate groups. They dissolve readily in various solvents, as for example in water, alcohols, such as methanol, ethanol, butanol, alcohol/water mixtures, acetone, 2-butanone, ethyl acetate, butyl acetate, methoxypropyl acetate, methoxyethyl acetate, tetrahydrofuran, dimethylformamide, dimethylacetamide, N-methylpyrrolidone, ethylene carbonate or propylene carbonate.

By a high-functionality polycarbonate is meant in the context of this invention a product which besides the carbonate groups which form the polymer backbone has terminally or pendently in addition at least four, preferably at least eight functional groups. The functional groups are carbonate groups and/or OH groups. In principle there is no upper limit on the number of terminal or pendent functional groups; however, products having a very high number of functional groups may exhibit unwanted properties, such as high viscosity or poor solubility, for example. The high-functionality polycarbonates of the present invention generally have no more than 500 terminal or pendent functional groups, preferably not more than 100, and more particularly not more than 50 terminal or pendent functional groups.

For the preparation of the high-functionality polycarbonates it is necessary to set the ratio of the OH-comprising compounds to the carbonate such that the resultant simplest condensation product (called condensation product (K) below) comprises on average either one carbonate group and more than one OH group or one OH group and more than one carbonate group. The simplest structure of the condensation product (K) of a carbonate (A) and a dialcohol or polyalcohol (B) produces the arrangement XY$_n$ or YX$_n$, X being a carbonate group, Y a hydroxyl group and n generally an integer between 1 and 6, preferably between 1 and 4, more preferably between 1 and 3. The reactive group, which results as a single group, is referred to below as "focal group".

Where, for example, in the preparation of the simplest condensation product (K) from a carbonate and a dihydric alcohol, the reaction ratio is 1:1, then the result on average is a molecule of type XY. In the case of the preparation of the condensation product (K) from a carbonate and a trihydric alcohol with a reaction ratio of 1:1. the result on average is a molecule of type XY$_2$. In the preparation of a condensation product (K) from a carbonate and a tetrahydric alcohol, again with the reaction ratio 1:1, the result on average is a molecule of type XY$_3$. The condensation product (K) can also be prepared, for example, from a carbonate and a trihydric alcohol where the reaction ratio on a molar basis is 2:1. Here the result on average is a molecule of type $X_2Y$, the focal group here being an OH group. Where the difunctional compounds, e.g. a dicarbonate of a diol, are additionally added to the components, this produces an extension of the chains. The result again is on average a molecule of type $XY_2$, the focal group being a carbonate group. The simple condensation products (K) react in accordance with the invention intermolecularly to form high-functionality polycondensation products (P). The reaction to give the condensation product (K) and to give the polycondensation product (P) takes place usually at a temperature of 0 to 250° C., preferably at 60 to 160° C., in bulk or in solution. In this context it is possible generally to use any solvents which are inert towards the respective reactants. Preference is given to using organic solvents, such as, for example, decane, dodecane, benzene, toluene, chlorobenzene, xylene, dimethylformamide, dimethylacetamide or solvent naphtha.

In one preferred embodiment the condensation reaction is carried out in bulk. The monofunctional alcohol ROH or the phenol which is liberated during the reaction can be removed from the reaction equilibrium in order to accelerate the reaction, such removal taking place by distillative means, if appropriate under reduced pressure.

If distillative removal is intended, it is advisable as a general rule to use carbonates which during the reaction give off alcohols ROH having a boiling point of less than 140° C.

To accelerate the reaction it is also possible to add catalysts or catalyst mixtures. Suitable catalysts are compounds which catalyze esterification or transesterification reactions, examples being alkali metal hydroxides, alkali metal carbonates, alkali metal hydrogen carbonates, preferably of sodium, of potassium or of cesium, tertiary amines, guanidines, ammonium compounds, phosphonium compounds, organoaluminum, organotin, organozinc, organotitanium, organozirconium or organobismuth compounds, and also catalysts of the kind known as double metal cyanide (DMC) catalysts, as described, for example, in DE 10138216 or in DE 10147712.

Preference is given to using potassium hydroxide, potassium carbonate, potassium hydrogen carbonate, diazabicyclooctane (DABCO), diazabicyclononene (DBN), diazabicycloundecene (DBU), imidazoles, such as imidazole, 1-methylimidazole or 1,2-dimethylimidazole, titanium tetrabutoxide, titanium tetraisopropoxide, dibutyltin oxide, dibutyltin dilaurate, tin dioctoate, zirconium acetylacetonate, or mixtures thereof.

The catalyst is generally added in an amount of 50 to 10 000 ppm by weight, preferably of 100 to 5000 ppm by weight, based on the amount of alcohol or alcohol mixture employed.

Furthermore it is also possible, either by adding the appropriate catalyst and/or by choosing a suitable temperature, to control the intermolecular polycondensation reaction. In addition the average molecular weight of the polymer (P) can be adjusted via the composition of the starting components and via the residence time.

The condensation products (K) and the polycondensation products (P), which have been prepared at an elevated temperature, are stable at room temperature usually for a relatively long period of time.

In view of the nature of the condensation products (K) it is possible that the condensation reaction may result in polycondensation products (P) having different structures, with branches but no crosslinks. Furthermore, the polycondensation products (P) ideally contain either a carbonate focal group and more than two OH groups, or else an OH focal group and more than two carbonate groups. The number of reactive groups depends on the nature of the condensation products (K) employed and on the degree of polycondensation. For example, a condensation product (K) may also react by triple intermolecular condensation to form two different polycondensation products (P).

To terminate the intermolecular polycondensation reaction there are a variety of possibilities. By way of example the temperature can be lowered to a range in which the reaction comes to a standstill and the product (K) or the polycondensation product (P) is stable on storage.

In a further embodiment, as soon as the intermolecular reaction of the condensation product (K) gives a polycondensation product (P) having the desired degree of polycondensation, the reaction can be arrested by adding to the product (P) a product having groups that are reactive toward the focal group of (P). For instance, in the case of a carbonate focal group, a mono-, di- or polyamine, for example, can be added. In the case of a hydroxyl focal group, the product (P) can have added to it, for example, a mono-, di- or polyisocyanate, a compound comprising epoxide groups, or an acid derivative which is reactive with OH groups.

The high-functionality polycarbonates of the invention are generally prepared in a pressure range from 0.1 mbar to 20 bar, preferably 1 mbar to 5 bar, in reactors or reactor cascades which are operated batchwise, semibatchwise or continuously.

As a result of the aforementioned setting of the reaction conditions and, if appropriate, as a result of the choice of suitable solvent, the products can be processed further following preparation, without additional purification.

In a further preferred embodiment the polycarbonates may comprise not only the functional groups already obtained by virtue of the reaction but also further functional groups. Functionalization can in this case take place during the buildup of molecular weight or else subsequently, i.e., after the end of the actual polycondensation.

If, before or during the buildup of molecular weight, components are added which besides hydroxyl or carbonate groups possess further functional groups or functional elements, then a polycarbonate polymer is obtained which has randomly distributed functionalities different from the carbonate and hydroxyl groups.

Effects of this kind can be achieved for example by adding, during the polycondensation, compounds which in addition to hydroxyl, carbonate or carbamoyl chloride groups carry further functional groups or functional elements, such as mercapto groups, primary, secondary or tertiary amino groups, ether groups, carboxylic acid derivatives, sulfonic acid derivatives, phosphonic acid derivatives, aryl radicals or long-chain alkyl radicals. For modification by means of carbamate groups it is possible for example to use ethanolamine, propanolamine, isopropanolamine, 2-(butylamino)ethanol, 2-(cyclohexylamino)ethanol, 2-amino-1-butanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)aminomethane, tris(hydroxyethyl)aminomethane, ethylenediamine, propylenediamine, hexamethylenediamine or isophoronediamine.

For modification with mercapto groups it is possible to use mercaptoethanol for example. Tertiary amino groups can be generated, for example, by incorporation of N-methyldiethanolamine, N-methyldipropanolamine or N,N-dimethylethanolamine. Ether groups can be generated, for example, by incorporating polyetherols having a functionality of two or more during condensation. Reaction with long-chain alkanediols enables long-chain alkyl radicals to be incorporated; reaction with alkyl or aryl diisocyanates generates polycarbonates containing alkyl, aryl, and urethane groups.

Subsequent functionalization can be obtained by reacting the resultant high-functionality hyperbranched polycarbonate with a suitable functionalizing reagent that is able to react with the polycarbonate's OH and/or carbonate groups.

High-functionality, hyperbranched polycarbonates comprising hydroxyl groups can be modified, for example, by adding molecules comprising acid groups or isocyanate groups. Polycarbonates comprising acid groups, for example, can be obtained by reaction with compounds comprising anhydride groups.

Additionally, high-functionality polycarbonates comprising hydroxyl groups can also be converted into high-functionality polycarbonate-polyetherpolyols by reaction with alkylene oxides-ethylene oxide, propylene oxide or butylene oxide, for example.

A great advantage of the method of the invention lies in its economy. Both the reaction to form a condensation product (K) or polycondensation product (P) and the reaction of (K) or (P) to form polycarbonates with other functional groups or elements can take place in one reaction apparatus, which is an advantage both technically and economically.

Hyperbranched Polyesters

As hyperbranched polyesters it is preferred to use those of $A_2B_x$ type. Particularly preferred are hyperbranched polyesters of $A_2B_3$ type. As compared with hyperbranched polyesters of the $AB_2$ type, these $A_2B_3$ polyesters have a less rigid structure. Consequently hyperbranched polyesters of $AB_2$ type are less preferred.

Hyperbranched polyesters that are suitable for use for increasing the gloss are obtainable by reacting at least one aliphatic, cycloaliphatic, araliphatic or aromatic dicarboxylic acid ($A_2$) or derivatives thereof with a) at least one at least trifunctional aliphatic, cycloaliphatic, araliphatic or aromatic alcohol ($B_3$), or
b) with at least one divalent aliphatic, cycloaliphatic, araliphatic or aromatic alcohol ($B_2$) with at least one x-valent aliphatic, cycloaliphatic, araliphatic or aromatic alcohol ($C_x$) which contains more than two OH groups, x being a number greater than 2, preferably 3 to 8, more preferably 3 to 6, very preferably 3 to 4, and more particularly 3, or by reacting at least one aliphatic, cycloaliphatic, araliphatic or aromatic carboxylic acid ($D_y$) or derivatives thereof containing more than two acid groups, y being a number greater than 2, preferably 3 to 8, more preferably 3 to 6, very preferably 3 to 4, and more particularly 3, with c) at least one at least difunctional aliphatic, cycloaliphatic, araliphatic or aromatic alcohol ($B_2$), or
d) with at least one divalent aliphatic, cycloaliphatic, araliphatic or aromatic alcohol ($B_2$) with at least one x-valent aliphatic, cycloaliphatic, araliphatic or aromatic alcohol ($C_x$) containing more than two OH groups, x being a number greater than 2, preferably 3 to 8, more preferably 3 to 6, very preferably 3 to 4, and more particularly 3,
e) if appropriate in the presence of further functionalized units E, and
f) optionally subsequent reaction with a monocarboxylic acid F, the proportion of the reactive groups in the reaction mixture being chosen so as to set a molar ratio of OH groups to carboxyl groups or derivatives thereof of 5:1 to 1:5, preferably of 4:1 to 1:4, more preferably of 3:1 to 1:3, and very preferably of 2:1 to 1:2.

By hyperbranched polyesters are meant for the purposes of this invention noncrosslinked polyesters having hydroxyl and carboxyl groups and being both structurally and molecularly nonuniform. Noncrosslinked for the purpose of this specification means that the degree of crosslinking present is less than 15% by weight, preferably less than 10% by weight, determined by way of the insoluble fraction of the polymer. The insoluble fraction of the polymer was determined by extracting for four hours using the same solvent as employed for the gel permeation chromatography, in other words tetrahydrofuran or hexafluoroisopropanol, depending on what solvent has better solvency for the polymer, in a Soxhlet apparatus, drying of the residue to constant weight, and weighing of the remaining residue.

The dicarboxylic acids ($A_2$) include for example aliphatic dicarboxylic acids, such as oxalic acid, malonic acid, succinic acid, glutaric acid, adipic acid, pimelinic acid, suberic acid, azelaic acid, sebacic acid, undecane-$\alpha,\omega$-dicarboxylic acid, dodecane-$\alpha,\omega$-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, cis- and trans-cyclopentane-1,3-dicarboxylic acid. It is also possible additionally to use aromatic dicarboxylic acids, such as phthalic acid, isophthalic acid or terephthalic acid, for example. Unsaturated dicarboxylic acids as well, such as maleic acid or fumaric acid, can be used.

Said dicarboxylic acids may also be substituted by one or more radicals selected from $C_1$-$C_{10}$ alkyl groups, $C_3$-$C_{12}$ cycloalkyl groups, alkylene groups such as methylene or ethylidene or $C_6$-$C_{14}$ aryl groups. Exemplary representatives of substituted dicarboxylic acids that may be mentioned include the following: 2-methylmalonic acid, 2-ethylmalonic acid, 2-phenylmalonic acid, 2-methylsuccinic acid, 2-ethylsuccinic acid, 2-phenylsuccinic acid, itaconic acid, 3,3-dimethylglutaric acid.

It is also possible to use mixtures of two or more of the aforementioned dicarboxylic acids.

The dicarboxylic acids can be used either as such or in the form of their derivatives.

$C_1$-$C_4$ alkyl specifically means methyl, ethyl, isopropyl, n-propyl, n-butyl, isobutyl, sec-butyl and tert-butyl, preferably methyl, ethyl and n-butyl, more preferably methyl and ethyl, and very preferably methyl.

It is also possible to use a mixture of a dicarboxylic acid and one or more of its derivatives. Likewise possible is to use a mixture of two or more different derivatives of one or more dicarboxylic acids.

Particular preference is given to using malonic acid, succinic acid, glutaric acid, adipic acid, 1,2-, 1,3- or 1,4-cyclohexanedicarboxylic acid (hexahydrophthalic acids), phthalic acid, isophthalic acid, terephthalic acid or the monoalkyl or dialkyl esters thereof.

Examples of tricarboxylic or polycarboxylic acids ($D_y$) that can be reacted include aconitic acid, 1,3,5-cyclohexanetricarboxylic acid, 1,2,4-benzenetricarboxylic acid, 1,3,5-benzenetricarboxylic acid, 1,2,4,5-benzenetetracarboxylic acid (pyromellitic acid) and also mellitic acid and low molecular weight polyacrylic acids.

Tricarboxylic acids or polycarboxylic acids ($D_y$) can be used either as such or else in the form of derivatives.

Derivatives are the corresponding anhydrides in monomeric or else polymeric form, mono- or dialkyl ester, preferably mono- or di-$C_1$-$C_4$-alkyl esters, more preferably mono- or dimethyl esters or the corresponding mono- or diethyl esters, additionally mono- and divinyl esters, and also mixed esters, preferably mixed esters having different $C_1$-$C_4$ alkyl components, more preferably mixed methyl ethyl esters.

It is also possible to use a mixture of a tricarboxylic or polycarboxylic acid and one or more of its derivatives, such as a mixture of pyromellitic acid and pyromellitic dianhydride, for example. It is likewise possible to use a mixture of two or more different derivatives of one or more tricarboxylic or polycarboxylic acids, such as a mixture of 1,3,5-cyclohexanetricarboxylic acid and pyromellitic dianhydride, for example.

Diols ($B_2$) used include for example ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,2-decanediol, 1,10-decanediol, 1,2-dodecanediol, 1,12-dodecanediol, 1,5-hexadiene-3,4-diol, 1,2- and 1,3-cyclopentanediols, 1,2-, 1,3- and 1,4-cyclohexanediols, 1,1-, 1,2-, 1,3- and 1,4-bis(hydroxymethyl)cyclohexanes, 1,1-, 1,2-, 1,3- and 1,4-bis(hydroxyethyl)cyclohexanes, neopentyl glycol, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H, n being an integer and $n \geq 4$, polyethylene-polypropylene glycols, the sequence of the ethylene oxide or propylene oxide units being blockwise or random, polytetramethylene glycols, preferably with a molar weight of up to 5000 g/mol, poly-1,3-propanediols, preferably with a molar weight up to 5000 g/mol, polycaprolactones, or mixtures of two or more representatives of the above compounds. Either one or both hydroxyl groups in the abovementioned diols may be substituted by SH groups. Diols whose use is preferred are ethylene glycol, 1,2-propanediol, 1,3-propanediol, 1,4-butanediol, 1,5-pentanediol, 1,6-hexanediol, 1,8-octanediol, 1,2-, 1,3- and 1,4-cyclohexanediol, 1,3- and 1,4-bis(hydroxymethyl)cyclohexane, and diethylene glycol, triethylene glycol, dipropylene glycol and tripropylene glycol, polyethylene glycols $HO(CH_2CH_2O)_n$—H or polypropylene glycols $HO(CH[CH_3]CH_2O)_n$—H, n being an integer and $n \geq 4$, polyethylene-polypropylene glycols, the sequence of the ethylene oxide or propylene oxide units being blockwise or random, or polytetramethylene glycols, preferably with a molar weight of up to 5000 g/mol.

The dihydric alcohols $B_2$ may optionally also comprise further functionalities such as carbonyl, carboxyl, alkoxycarbonyl or sulfonyl, for example, such as dimethylolpropionic acid or dimethylolbutyric acid, for example, and also their $C_1$-$C_4$ alkyl esters, glycerol monostearate or glycerol monooleate.

Alcohols with a functionality of at least three ($C_x$) comprise glycerol, trimethylolmethane, trimethylolethane, trimethylolpropane, 1,2,4-butanetriol, tris(hydroxymethyl) amine, tris(hydroxyethyl)amine, tris(hydroxypropyl)amine, pentaerythritol, diglycerol, triglycerol or higher condensates of glycerol, di(trimethylolpropane), di(pentaerythritol), trishydroxymethyl isocyanurate, tris(hydroxyethyl) isocyanurate (THEIC), tris(hydroxypropyl) isocyanurate, inositols or sugars, such as glucose, fructose or sucrose, for example, sugar alcohols such as sorbitol, mannitol, threitol, erythritol, adonitol (ribitol), arabitol (lyxitol), xylitol, dulcitol (galactitol), maltitol, isomalt, polyetherols with a functionality of three or more, based on alcohols with a functionality of three or more and on ethylene oxide, propylene oxide and/or butylene oxide.

Particular preference is given here to glycerol, diglycerol, triglycerol, trimethylolethane, trimethylolpropane, bis(trimethylolpropane), 1,2,4-butanetriol, pentaerythritol, di(pertaerythritol), tris(hydroxyethyl) isocyanurate and also polyetherols thereof based on ethylene oxide and/or propylene oxide.

The reaction can be carried out in the absence or the presence of a solvent. Examples of suitable solvents include hydrocarbons such as paraffins, aromatics, ethers, and ketones. Preferably the reaction is carried out free from solvent. It is possible to carry out the reaction in the presence of a water-removing agent, as an additive added at the beginning of the reaction. Suitable examples include molecular sieves, especially molecular sieve 4 Å, $MgSO_4$ and $Na_2SO_4$. It is also possible to remove water and/or alcohol during the reaction, by distillation and, for example, to use a water separator, in which case the water is removed with the aid of an entrainer.

The reaction can be carried out in the absence of catalysts. It is preferred, however, to operate in the presence of at least one catalyst. These are preferably acidic inorganic, organometallic or organic catalysts or mixtures of two or more acidic inorganic, organometallic or organic catalysts.

Acidic inorganic catalysts for the purposes of the present invention are for example sulfuric acid, sulfates, and hydrogen sulfates, such as sodium hydrogen sulfate, phosphoric acid, phosphonic acid, hypophosphorous acid, aluminum sulfate hydrate, alum, acidic silica gel (pH $\leq 6$, especially $\leq 5$), and acidic aluminum oxide. Further acidic inorganic catalysts which can be used include, for example, aluminum compounds of the general formula $Al(OR^1)_3$ and titanates. Preferred acidic organometallic catalysts are for example dialkyltin oxides or dialkyltin esters. Preferred acidic organic catalysts are acidic organic compounds containing, for example, phosphate groups, sulfonic acid groups, sulfate groups or phosphonic acid groups. Acidic ion exchangers can also be used as acidic organic catalysts.

The reaction is carried out at temperatures from 60 to 250° C.

The hyperbranched polyesters used in accordance with the invention have a molecular weight $M_w$ of at least 500, preferably at least 600, and more preferably 1000 g/mol. The upper limit of the molecular weight $M_w$ is preferably 500 000 g/mol; with particular preference it is not more than 200 000, and with very particular preference not more 100 000 g/mol.

The figures on the polydispersity and also on the number-average and weight-average molecular weight, $M_n$ and $M_w$, refer here to measurements made by gel permeation chromatography using polymethyl methacrylate as a standard and using tetrahydrofuran, dimethylformamide, dimethylacetamide or hexafluoroisopropanol as eluant. The method is described in Analytiker Taschenbuch, vol. 4, pages 433 to 442, Berlin 1984.

The polydispersity of polyesters used in accordance with the invention is generally 1.2 to 50, preferably 1.4 to 40, more preferably 1.5 to 30, and very preferably 2 to 30.

Hyperbranched Polyurethanes

As used herein, the term "polyurethanes" extends beyond the customary understanding and includes polymers which are obtainable by reaction of di- or polyisocyanates with active-hydrogen compounds and which are linkable together by urethane structures, but also for example by urea, allophanate, biuret, carbodiimide, amide, uretonimine, uretdione, isocyanurate or oxazolidone structures.

The hyperbranched polyurethanes used according to the invention can be synthesized using $AB_x$ monomers containing not only isocyanate groups but also groups capable of reacting with isocyanate groups to form a linkage. To synthesize the hyperbranched polyurethanes used according to the invention it is also possible to employ monomer combinations which initially, as intermediates, form $AB_x$ building blocks, where x is a natural number between 2 and 8, preferably 2 or 3. Such hyperbranched polyurethanes and processes for preparing them are described in WO 97/02304, hereby incorporated by reference. Suitable hyperbranched polyurethanes can also be obtained by reacting diisocyanates and/or polyisocyanates with compounds having at least two isocyanate-reactive groups, at least one of the reactants containing functional groups whose reactivity is different from that of the other reactant, and the reaction conditions being chosen such that in each reaction step only certain reactive groups react with one another in each case. Such hyperbranched polyurethanes and processes for preparing them are described in EP 1026185, hereby incorporated by reference.

The isocyanate-reactive groups are preferably OH—, $NH_2$—, NHR— or SH groups.

The $AB_x$ monomers are preparable in a conventional manner. $AB_x$ monomers are synthesizable for example by the method described in WO 97/02304 using protective group techniques. This technique may be illustrated with reference to the preparation of an $AB_2$ monomer from 2,4-toluoylene diisocyanate (TDI) and trimethylolpropane. First, one of the isocyanate groups of the TDI is blocked in a conventional manner, for example by reaction with an oxime. The remaining free NCO group is reacted with trimethylolpropane, although only one of the three OH groups reacts with the isocyanate group, the other two OH groups being blocked via acetalization. Elimination of the protective group leaves a molecule having one isocyanate group and two OH groups.

A particularly advantageous way to synthesize $AB_x$ molecules is by the method described in DE-A 199 04 444, where no protective groups are required. Di- or polyisocyanates are used in this method and reacted with compounds having at least two isocyanate-reactive groups. At least one of the reactants has groups having a reactivity that differs with regard to the other reactant. Preferably, both reactants have groups that differ in reactivity with regard to the other reactant. The reaction conditions are chosen in such a way that only certain reactive groups can react with each other.

Useful di- and polyisocyanates include the aliphatic, cycloaliphatic and aromatic isocyanates known from the prior art. Preferred di- or polyisocyanates are 4,4'-diphenylmethane diisocyanate, the mixtures of monomeric diphenylmethane diisocyanates and oligomeric diphenylmethane diisocyanates (polymer MDI), tetramethylene diisocyanate, hexamethylene diisocyanate, 4,4'-methylenebis(cyclohexyl) diisocyanate, xylylene diisocyanate, tetramethylxylylene diisocyanate, dodecyl diisocyanate, lysine alkyl ester diisocyanate, where alkyl is $C_1$-$C_{10}$ alkyl, 2,2,4- or 2,4,4-trimethyl-1,6-hexamethylene diisocyanate, 1,4-diisocyanatocyclohexane or 4-isocyanatomethyl-1,8-octamethylene diisocyanate.

Particular preference is given to di- or polyisocyanates having NCO groups of different reactivities, such as 2,4-toluoylene diisocyanate (2,4-TDI), 2,4'-diphenylmethane diisocyanate (2,4'-MDI), triisocyanatotoluene, isophorone diisocyanate (IPDI), 2-butyl-2-ethylpentamethylene diisocyanate, 2-isocyanatopropylcyclohexyl isocyanate, 3(4)-isocyanatomethyl-1-methylcyclohexyl isocyanate, 1,4-diisocyanato-4-methylpentane, 2,4'-methylenebis(cyclohexyl) diisocyanate and 4-methylcyclohexane 1,3-diisocyanate (H-TDI). Particular preference is further given to isocyanates (b) whose NCO groups initially have equal reactivity, but where first addition of an alcohol or amine to an NCO group can be used to induce a reactivity reduction for the second NCO group. Examples thereof are isocyanates whose NCO groups are coupled via a delocalized electron system, for example 1,3- and 1,4-phenylene diisocyanate, 1,5-naphthylene diisocyanate, diphenyl diisocyanate, tolidine diisocyanate or 2,6-toluoylene diisocyanate.

It is further possible to use for example oligo- or polyisocyanates preparable from the di- or polyisocyanates mentioned or mixtures thereof by linkage by means of urethane, allophanate, urea, biuret, uretdione, amide, isocyanurate, carbodiimide, uretonimine, oxadiazinetrione or iminooxadiazinedione structures.

Compounds used as having at least two isocyanate-reactive groups are preferably di-, tri- or tetrafunctional compounds whose functional groups have different reactivities toward NCO groups. Preference is given to compounds having at least one primary and at least one secondary hydroxyl group, at least one hydroxyl group and at least one mercapto group, particularly preferably having at least one hydroxyl group and at least one amino group in the molecule, especially amino alcohols, aminodiols and aminotriols, since amino is substantially more reactive with isocyanate than is hydroxyl.

Examples of said compounds having at least two isocyanate-reactive groups are propylene glycol, glycerol, mercaptoethanol, ethanolamine, N-methylethanolamine, diethanolamine, ethanolpropanolamine, dipropanolamine, diisopropanolamine, 2-amino-1,3-propanediol, 2-amino-2-methyl-1,3-propanediol or tris(hydroxmethyl)aminomethane. Mixtures of the compounds mentioned may also be used.

The preparation of an $AB_2$ molecule may be illustrated for a diisocyanate with an aminodiol. First one mole of a diisocyanate is reacted with one mole of aminodiol at low temperatures, preferably in the range from −10 to 30° C. The urethane-forming reaction is virtually completely suppressed in this temperature range and the more reactive NCO groups of the isocyanate react exclusively with the amino group of the aminodiol. The $AB_x$ molecule formed has one free NCO group and two free OH groups and can be used for synthesizing a highly branched polyurethane.

On heating and/or catalyst addition this $AB_2$ molecule can react intermolecularly to form a highly branched polyurethane. The synthesis of the hyperbranched polyurethane may advantageously be effected without prior isolation of the $AB_x$ molecule in a further reaction step at elevated temperature, preferably in the range between 30 and 80° C. Using the above-described $AB_2$ molecule having two OH groups and one NCO group provides a hyperbranched polymer having per molecule one free NCO group and also—depending on the degree of polymerization—a certain number of OH groups. The reaction can be carried on to high conversions to provide very high molecular weight structures. But it may also be discontinued for example by addition of suitable monofunctional compounds or by addition of one of the starting compounds for preparing the $AB_2$ molecule on attainment of the desired molecular weight. Depending on the starting compound used for the termination, this provides either completely NCO-terminated or completely OH-terminated molecules.

Alternatively, it is also possible for example to prepare an $AB_2$ molecule from one mole of glycerol and 2 mol of 2,4-TDI. The primary alcohol groups and the isocyanate group in position 4 react preferentially at low temperature to form an adduct which has one OH group and two isocyanate groups and which, as described, can be converted at higher temperatures into a hyperbranched polyurethane. This initially provides a hyperbranched polymer which has one free OH group and—depending on the degree of polymerization—a certain number of NCO groups.

The hyperbranched polyurethanes may in principle be prepared without solvent, but are preferably prepared in solution. Useful solvents include in principle all compounds that are liquid at room temperature and inert toward the monomers and polymers.

Other products are obtainable through further synthetic variants. $AB_3$ molecules are obtainable for example by reacting diisocyanates with compounds having at least 4 isocyanate-reactive groups. An example is the reaction of 2,4-toluoylene diisocyanate with tris(hydroxymethyl)aminomethane.

The polymerization may also be terminated using polyfunctional compounds capable of reacting with the respective A groups. This makes it possible to link a plurality of small hyperbranched molecules together to form a large hyperbranched molecule.

Hyperbranched polyurethanes having chain-extended branches are obtainable for example by using for the polymerization reaction as well as the $AB_x$ molecules additionally in a molar ratio of 1:1 a diisocyanate and a compound having two isocyanate-reactive groups. These additional AA or BB compounds may also have further functional groups which, however, must not be reactive toward the A or B groups under the reaction conditions chosen. This makes it possible to introduce further functionalities into the hyperbranched polymer Further synthetic variants for hyperbranched polyurethanes are disclosed in DE 100 13 187 and DE 100 30 869.

As stated above, the functional groups of the hyperbranched polyurethanes obtained by synthesis reaction may also be hydrophobicized, hydrophilicized or transfunctionalized. Owing to their reactivity, hyperbranched polyurethanes containing isocyanate groups are very particularly useful for transfunctionalization. It is also possible to transfunctionalize OH- or $NH_2$-terminated polyurethanes by means of suitable reaction partners.

Preferred groups for introduction into hyperbranched polyurethanes are —COON, —$CONH_2$, —OH, —$NH_2$, —NHR, —$NR_2$, —$NR_3^+$, —$SO_3H$, and their salts.

Groups having sufficiently acidic H atoms are convertible into the corresponding salts by treatment with suitable bases. Similarly, basic groups are convertible into the corresponding salts using suitable acids. This makes it possible to obtain hyperbranched polyurethanes that are soluble in water.

By reacting NCO-terminated products with alcohols and amines, especially alcohols and amines having $C_8$-$C_{40}$-alkyl radicals, it is possible to obtain hydrophobicized products.

Hydrophilicized but nonionic products are obtainable by reaction of NCO-terminated polymers with polyether alcohols, for example di-, tri- or tetra- or polyethylene glycol.

Acid groups are incorporable for example by reaction with hydroxycarboxylic acids, hydroxysulfonic acids or amino acids. Examples of suitable reaction partners are 2-hydroxyacetic acid, 4-hydroxybenzoic acid, 12-hydroxydodecanoic acid, 2-hydroxyethanesulfonic acid, glycine or alanine.

It is also possible to generate hyperbranched polyurethanes having different functionalities. This can be accomplished for example by reaction with a mixture of various compounds or else by reacting only a portion of the functional groups originally present, for example only a portion of the OH and/or NCO groups.

The transfunctionalization of the hyperbranched polyurethane may advantageously be effected immediately following the polymerization reaction without the NCO-terminated polyurethane being isolated beforehand. But the functionalization may also take place in a separate reaction.

The hyperbranched polyurethanes used according to the invention generally have on average at least 4 and not more than 100 functional groups. The hyperbranched polyurethanes preferably have 8 to 80, more preferably 8 to 50, functional groups. Preferably used hyperbranched polyurethanes have a weight-average molecular weight $M_W$ of from 1000 to 500 000 g/mol, preferably of from 5000 to 200 000 g/mol, more preferably of 10 000 to 100 000 g/mol.

Hyperbranched Polyureas

High-functionality hyperbranched polyureas which can be used inventively as constituents for increasing the gloss can be obtained, for example, by reacting one or more carbonates with one or more amines having at least two primary and/or secondary amino groups, where at least one amine has at least three primary and/or secondary amino groups.

Suitable carbonates are aliphatic, aromatic or mixed aliphatic-aromatic carbonates; preference is given to aliphatic carbonates such as dialkyl carbonates having $C_1$-$C_{12}$ alkyl radicals. Examples are ethylene carbonate, 1,2- or 1,3-propylene carbonate, diphenyl carbonate, ditolyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, diheptyl carbonate, dioctyl carbonate, didecyl carbonate or didodecyl carbonate. Carbonates used with particular preference are dimethyl carbonate, diethyl carbonate, dibutyl carbonate, and diisobutyl carbonate.

The carbonates are reacted with one or more amines having at least two primary and/or secondary amino groups, at least one amine having at least three primary and/or secondary amino groups. Amines having two primary and/or secondary amino groups produce a chain extension within the polyureas, whereas amines having three or more primary or secondary amino groups are responsible for the branching in the resultant high-functionality, hyperbranched polyureas.

Suitable amines having two primary or secondary amino groups which are reactive toward a carbonate or carbamate group are for example ethylenediamine, N-alkyl-ethylenediamine, propylenediamine, 2,2-dimethyl-1,3-propylenediamine, N-alkyl-propylenediamine, butylenediamine, N-alkylbutylenediamine, pentanediamine, hexamethylenediamine, N-alkylhexamethylenediamine, heptanediamine, octanediamine, nonanediamine, decanediamine, dodecanediamine, hexadecanediamine, tolylenediamine, xylylenediamine, diaminodiphenylmethane, diaminodicyclo-hexylmethane, phenylenediamine, cyclohexylenediamine, bis(aminomethyl)-cyclohexane, diaminodiphenyl sulfone, isophoronediamine, 2-butyl-2-ethyl-1,5-penta-methylenediamine, 2,2,4- or 2,4,4-trimethyl-1,6-hexamethylenediamine, 2-aminopropyl-cyclohexylamine, 3(4)-aminomethyl-1-methylcyclohexylamine, 1,4-diamino-4-methyl-pentane, amine-terminated polyoxyalkylene polyols (known as Jeffamines) or amine-terminated polytetramethylene glycols.

The amines preferably have two primary amino groups, such as, for example, ethylenediamine, propylenediamine, 2,2-dimethyl-1,3-propanediamine, butylene-diamine, pentanediamine, hexamethylenediamine, heptanediamine, octanediamine, nonanediamine, decanediamine, dodecanediamine, hexadecanediamine, tolylenediamine, xylylenediamine, diaminodiphenylmethane, diamino-dicyclohexylmethane, phenylenediamine, cyclohexylenediamine, diaminodiphenyl sulfone, isophoronediamine, bis(aminomethyl)cyclohexane, 2-butyl-2-ethyl-1,5-pentamethylenediamine, 2,2,4- or 2,4,4-trimethyl-1,6- hexamethylenediamine, 2-aminopropylcyclohexylamine, 3(4)-aminomethyl-1-methylcyclohexylamine, 1,4-diamino-4-methylpentane, amine-terminated polyoxyalkylene polyols (known as Jeffamines) or amine-terminated polytetramethylene glycols.

Particular preference is given to butylenediamine, pentanediamine, hexamethylenediamine, tolylenediamine, xylylenediamine, diaminodiphenylmethane, diaminodicyclohexylmethane, phenylenediamine, cyclohexylenediamine, diaminodiphenyl sulfone, isophoronediamine, bis(aminomethyl)cyclohexane, amine-terminated polyoxyalkylene polyols (known as Jeffamines) or amine-terminated polytetramethylene glycols.

Suitable amines having three or more primary and/or secondary amino groups which are reactive toward a carbonate or carbamate group are for example tris(aminoethyl)amine, tris(aminopropyl)amine, tris(aminohexyl)amine, trisaminohexane, 4-aminomethyl-1,8-octamethylenediamine, trisaminononane, bis(aminoethyl)amine, bis(aminopropyl)amine, bis(aminobutyl)amine, bis(aminopentyl)amine, bis(aminohexyl)amine, N-(2-aminoethyl)propanediamine, melamine, oligomeric diaminodiphenylmethanes, N,N'-bis(3-aminopropyl)ethylenediamine, N,N'-bis(3-aminopropyl)butanediamine, N,N,N',N'-tetra(3-aminopropyl)ethylenediamine, N,N,N',N'-tetra(3-aminopropyl)butylenediamine, amine-terminated polyoxyalkylene-polyols with a functionality of three or more (known as Jeffamines), polyethyleneimines with a functionality of three or more, or polypropyleneimines with a functionality of three or more.

Preferred amines having three or more reactive primary and/or secondary amino groups are tris(aminoethyl)amine, tris(aminopropyl)amine, tris(aminohexyl)amine, trisaminohexane, 4-aminomethyl-1,8-octamethylenediamine, trisaminononane, bis(aminoethyl)amine, bis(aminopropyl)amine, bis(aminobutyl)amine, bis(aminopentyl)-amine, bis(aminohexyl)amine, N-(2-aminoethyl)propanediamine, melamine or amine-terminated polyoxyalkylene polyols having a functionality of three or more (known as Jeffamines).

Particular preference is given to amines having three or more primary amino groups, such as tris(aminoethyl)amine, tris(aminopropyl)amine, tris(aminohexyl)amine, trisaminohexane, 4-aminomethyl-1,8-octamethylenediamine, trisaminononane or amine-terminated polyoxyalkylene polyols having a functionality of three or more (known as Jeffamines).

It will be appreciated that mixtures of said amines can also be used.

In general not only amines having two primary or secondary amino groups but also amines having three or more primary or secondary amino groups are used. Amine mixtures of this kind can also be characterized by the average amine functionality, with unreactive tertiary amino groups disregarded. Thus for example an equimolar mixture of a diamine and a triamine has an average functionality of 2.5. Preference is given to the reaction in accordance with the invention of amine mixtures in which the average amine functionality is from 2.1 to 10, in particular from 2.1 to 5.

The reaction of the carbonate with the diamine or polyamine to form the inventively used high-functionality hyperbranched polyurea is accompanied by elimination of the alcohol or phenol bound in the carbonate. If one molecule of carbonate reacts with two amino groups then two molecules of alcohol or phenol are eliminated and one urea group is formed. If one molecule of carbonate reacts with only one amino group then a carbamate group is formed with elimination of a molecule of alcohol or phenol.

The reaction of the carbonate or carbonates with the amine or amines can take place in a solvent. In that case it is possible in general to use any solvents which are inert toward the respective reactants. Preference is given to working in organic solvents, such as decane, dodecane, benzene, toluene, chlorobenzene, dichlorobenzene, xylene, dimethylformamide, dimethylacetamide or solvent naphtha.

In one preferred embodiment the reaction is carried out in bulk, i.e., without inert solvent. The alcohol or phenol liberated during the reaction between amine and carbonate or carbamate can be separated off by distillation, if appropriate under reduced pressure, and thus removed from the reaction equilibrium. This also accelerates the reaction.

In order to accelerate the reaction between amine and carbonate or carbamate it is also possible to add catalysts or catalyst mixtures. Suitable catalysts are generally compounds which catalyze the formation of carbamate or urea, examples being alkali metal or alkaline earth metal hydroxides, alkali metal or alkaline earth metal hydrogen carbonates, alkali metal or alkaline earth metal carbonates, tertiary amines, ammonium compounds, or organic compounds of aluminum, tin, zinc, titanium, zirconium or bismuth. By way of example it is possible to use lithium, sodium, potassium or cesium hydroxide, lithium, sodium, potassium or cesium carbonate, diazabicyclooctane (DABCO), diazabicyclononene (DBN), diazabicycloundecene (DBU), imidazoles, such as imidazole, 1-methylimidazole, 2-methylimidazole, and 1,2-dimethylimidazole, titanium tetrabutoxide, dibutyltin oxide, dibutyltin dilaurate, tin dioctoate, zirconium acetylacetonate or mixtures thereof.

The addition of the catalyst is made generally in an amount of from 50 to 10 000 ppm, preferably from 100 to 5000 ppm, by weight based on the amount of amine used.

Following the reaction, in other words without further modification, the high-functionality hyperbranched polyureas prepared in this way are terminated with either amino groups or carbamate groups. They dissolve readily in polar solvents, such as in water, alcohols, such as methanol, ethanol, butanol, alcohol/water mixtures, dimethylformamide, dimethylacetamide, N-methylpyrrolidone, ethylene carbonate or propylene carbonate.

A high-functionality hyperbranched polyurea for the purposes of the invention is a product which has urea groups and also at least four, preferably at least six, in particular at least eight functional groups. There is in principle no upper limit on the number of functional groups, although products with a very large number of functional groups may exhibit unwanted properties, such as a high viscosity or a poor solubility. The high-functionality polyureas used inventively generally do not have more than 100 functional groups, preferably not more than 30 functional groups. By functional groups here are meant primary, secondary or tertiary amino groups or carbamate groups. In addition it is possible for the high-functionality hyperbranched polyurea to contain further functional groups, which do not participate in the synthesis of the hyperbranched polymer (see below). These further functional groups can be introduced by means of diamines or polyamines which contain further functional groups in addition to primary and secondary amino groups.

The polyureas used inventively may comprise other functional groups. Functionalization can in that case be effected during the reaction of the carbonate with the amine or amines, in other words during the polycondensation reaction which produces the increase in molecular weight, or else after the end of the polycondensation reaction, by subsequent functionalization of the resulting polyureas.

If before or during the molecular weight build-up components are added which as well as amino groups or carbamate groups contain further functional groups, then the product is a polyurea having randomly distributed further—that is, other than the carbamate groups or amino groups—functional groups.

By way of example, before or during the polycondensation, components can be added which in addition to amino groups or carbamate groups contain hydroxyl groups, mercapto groups, tertiary amino groups, ether groups, carboxyl groups, sulfonic acid groups, phosphonic acid groups, aryl radicals or long-chain alkyl radicals.

Hydroxyl-containing components which can be added for functionalization comprise for example ethanolamine, N-methylethanolamine, propanolamine, isopropanolamine, butanolamine, 2-amino-1-butanol, 2-(butylamino)ethanol, 2-(cyclohexylamino)ethanol, 2-(2'-aminoethoxy)ethanol or higher alkoxylation products of ammonia, 4-hydroxypiperidine, 1-hydroxyethylpiperazine, diethanolamine, dipropanolamine, diisopropanolamine, tris(hydroxymethyl)aminomethane or tris(hydroxyethyl)aminomethane.

Mercapto-comprising components which can be added for functionalization comprise, for example, cysteamine. With tertiary amino groups it is possible to functionalize the hyperbranched polyureas through the use, for example, of N-methyldiethylenetriamine or N,N-dimethylethylenediamine. With ether groups it is possible to functionalize the hyperbranched polyureas by using amine-terminated polyetherols (known as Jeffamines). With acid groups it is possible to functionalize the hyperbranched polyureas through the use, for example, of aminocarboxylic acids, aminosulfonic acids or aminophosphonic acids. With long-chain alkyl radicals the hyperbranched polyureas can be functionalized by using alkylamines or alkyl isocyanates having long-chain alkyl radicals.

The polyureas can also be functionalized, furthermore, by using small amounts of monomers which contain functional groups different from amino groups or carbamate groups. Mention may be made here by way of example of alcohols with a functionality of two, three or more, which can be incorporated into the polyurea by way of carbonate or carbamate functions. Thus, for example, hydrophobic properties can be obtained by adding long-chain alkanediols, alkenediols or alkynediols, while polyethylene oxide diols or triols produce hydrophilic properties in the polyurea.

The said functional groups other than amine, carbonate or carbamate groups that are introduced before or during the polycondensation are generally introduced in amounts of from 0.1 to 80 mol %, preferably in amounts of from 1 to 50 mol %, based on the sum of the amino, carbamate, and carbonate groups.

Subsequent functionalization of high-functionality hyperbranched polyureas comprising amino groups can be achieved for example by adding molecules comprising acid groups, isocyanate groups, keto groups or aldehyde groups or molecules comprising activated double bonds, acrylic double bonds for example. By way of example it is possible to obtain polyureas comprising acid groups by reaction with acrylic acid or maleic acid and derivatives thereof, with subsequent hydrolysis if appropriate.

Additionally it is possible to convert high-functionality hyperbranched polyureas comprising amino groups into high-functionality polyurea polyols by reaction with alkylene oxides, for example ethylene oxide, propylene oxide or butylene oxide.

The formation of salts with protic acids or quaternization of the amino functions with alkylating reagents, such as methyl halides or dialkyl sulfates, allows the high-functionality, hyperbranched polyureas to be made water-soluble or water-dispersible.

In order to achieve hydrophobicization it is possible for amine-terminated high-functionality hyperbranched polyureas to be reacted with saturated or unsaturated long-chain carboxylic acids, their derivatives that are reactive toward amine groups, or else with a aliphatic or aromatic isocyanates.

Polyureas terminated with carbamate groups can be hydrophobicized by reaction with long-chain alkyl amines or long-chain aliphatic monoalcohols.

Hyperbranched Polyamides

Suitable hyperbranched polyamides are preparable by reacting a first monomer $A_2$ having at least two functional groups A with a second monomer $B_3$ having at least three functional groups B, where 1) the functional groups A and B react with one another, and
2) one of the monomers A and B is an amine and the other of the monomers A and B is a carboxylic acid or an acrylate.

Suitable hyperbranched polyamides include hyperbranched polyamidoamines (see EP-A 802 215, US 2003/0069370 A1 and US 2002/0161113 A1).

Although the first monomer $A_2$ can also have more than two functional groups A, it is here termed $A_2$ for simplicity, and although the second monomer $B_3$ can also have more than three functional groups B it is here termed $B_3$ for simplicity. The important factor is simply that the functionalities of $A_2$ and $B_3$ are different.

According to condition 1), the functional groups A and B react with one another. The selection of the functional groups A and B is therefore such that A does not react with A (or reacts only to an insubstantial extent) and B does not react with B (or reacts only to an insubstantial extent), but A reacts with B.

According to condition 2), one of the monomers A and B is an amine and the other of the monomers A and B is a carboxylic acid.

Preferably, the monomer $A_2$ is a carboxylic acid having at least two carboxy groups, and the monomer $B_3$ is an amine having at least three amino groups. As an alternative the monomer $A_2$ is an amine having at least two amino groups, and the monomer $B_3$ is a carboxylic acid having at least three carboxy groups.

Suitable carboxylic acids usually have from 2 to 4, in particular 2 or 3, carboxy groups, and have an alkyl, aryl, or arylalkyl radical having from 1 to 30 C atoms.

Examples of dicarboxylic acids which may be used are: oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, and also cis- and trans-cyclopentane-1,3-dicarboxylic acid, and the dicarboxylic acids here may have substitution by one or more radicals selected from: $C_1$-$C_{10}$ alkyl groups, $C_3$-$C_{12}$ cycloalkyl groups, alkylene groups, and $C_6$-$C_{14}$ aryl groups. Examples which may be mentioned of substituted dicarboxylic acids are: 2-methylmalonic acid, 2-ethylmalonic acid, 2-phenylmalonic acid, 2-methylsuccinic acid, 2-ethylsuccinic acid, 2-phenylsuccinic acid, itaconic acid, and 3,3-dimethylglutaric acid.

Other suitable compounds are ethylenically unsaturated dicarboxylic acids, such as maleic acid and fumaric acid, and also aromatic dicarboxylic acids, such as phthalic acid, isophthalic acid, or terephthalic acid.

Examples of suitable tricarboxylic acids or tetracarboxylic acids are trimesic acid, trimellitic acid, pyromellitic acid, butanetricarboxylic acid, naphthalenetricarboxylic acid, and cyclohexane-1,3,5-tricarboxylic acid.

It is also possible to use mixtures of two or more of the abovementioned carboxylic acids. The carboxylic acids may either be used as they stand or in the form of derivatives. These derivatives are in particular the anhydrides of the carboxylic acids mentioned, and specifically in monomeric or else polymeric form;
the esters of the carboxylic acids mentioned, e.g.,
mono- or dialkyl esters, preferably mono- or dimethyl esters, or the corresponding mono- or diethyl esters, or else the mono- and dialkyl esters derived from higher alcohols, such as n-propanol, isopropanol, n-butanol, isobutanol, tert-butanol, n-pentanol, n-hexanol,
mono- and divinyl esters, and also
mixed esters, preferably methyl ethyl esters.

It is also possible to use a mixture composed of a carboxylic acid and of one or more of its derivatives, or a mixture of two or more different derivatives of one or more dicarboxylic acids.

The carboxylic acid used more preferably comprises succinic acid, glutaric acid, adipic acid, cyclohexanedicarboxylic acids, phthalic acid, isophthalic acid, terephthalic acid, or mono- or dimethyl esters thereof. Succinic acid and adipic acid are very particularly preferred.

Suitable amines usually have from 2 to 6, in particular from 2 to 4, amino groups, and an alkyl, aryl, or arylalkyl radical having from 1 to 30 C atoms.

Examples of diamines which may be used are those of the formula $R^1$—NH—$R^2$—NH—$R^3$, where $R^1$, $R^2$, and $R^3$, independently of one another, are hydrogen or an alkyl, aryl, or arylalkyl radical having from 1 to 20 C atoms. The alkyl radical may be linear or in particular for $R^2$ may also be cyclic.

Examples of suitable diamines are ethylenediamine, the propylenediamines (1,2-diaminopropane and 1,3-diaminopropane), N-methylethylenediamine, piperazine, tetramethylenediamine (1,4-diaminobutane), N,N'-dimethylethylenediamine, N-ethylethylenediamine, 1,5-diaminopentane, 1,3-diamino-2,2-diethylpropane, 1,3-bis(methylamino)propane, hexamethylenediamine (1,6-diaminohexane), 1,5-diamino-2-methylpentane, 3-(propylamino)propylamine, N,N'-bis(3-aminopropyl)piperazine, N,N'-bis(3-aminopropyl)piperazine, and isophoronediamine (IPDA).

Examples of suitable triamines, tetramines, or higher-functionality amines are tris(2-aminoethyl)amine, tris(2-aminopropyl)amine, diethylenetriamine (DETA), triethylenetetramine (TETA), tetraethylenepentamine (TEPA), isopropylenetriamine, dipropylenetriamine, and N,N'-bis(3-aminopropylethylenediamine).

Aminobenzylamines and aminohydrazides having 2 or more amino groups are likewise suitable.

The amines used particularly preferably comprise DETA or tris(2-aminoethyl)amine or a mixture of these.

It is also possible to use a mixture of two or more carboxylic acids or carboxylic acid derivatives, or a mixture of two or more amines. The functionality of the various carboxylic acids or amines here may be identical or different.

In particular, if the monomer $A_2$ is a diamine, the monomer $B_3$ used may comprise a mixture of dicarboxylic acids and tricarboxylic acids (or higher-functionality carboxylic acids), the average functionality of the mixture $B_3$ being at least 2.1. By way of example, a mixture composed of 50 mol % of dicarboxylic acid and 50 mol % of tricarboxylic acid has an average functionality of 2.5.

Similarly, if the monomer $A_2$ is a dicarboxylic acid, the monomer $B_3$ used may comprise a mixture of diamines and triamines (or higher-functionality amines), the average functionality of the mixture $B_3$ being at least 2.1. This variant is particularly preferred. By way of example, a mixture composed of 50 mol % of diamine and 50 mol % of triamine has an average functionality of 2.5.

The reactivity of the functional groups A of the monomer $A_2$ may be identical or different. Equally, the reactivity of the functional groups B of the monomer $B_3$ may be identical or different. In particular, the reactivity of the two amino groups of the monomer $A_2$ or of the three amino groups of the monomer $B_3$ may be identical or different.

In one preferred embodiment, the carboxylic acid is the difunctional monomer $A_2$ and the amine is the trifunctional monomer $B_3$, and this means that it is preferable to use dicarboxylic acids and triamines or higher-functionality amines.

The monomer $A_2$ used more preferably comprises a dicarboxylic acid, and the monomer $B_3$ used more preferably comprises a triamine. The monomer $A_2$ used very preferably comprises adipic acid and the monomer $B_3$ used very preferably comprises diethylenetriamine or tris(2-aminoethyl)amine.

During or after the polymerization of the monomers $A_2$ and $B_3$ to give the hyperbranched polyamide, use may also be made of difunctional or higher-functionality monomers C acting as chain extenders. This allows control over the gel point of the polymer (juncture at which insoluble gel particles are formed via crosslinking reactions; see by way of example Flory, Principles of Polymer Chemistry, Cornell University Press, 1953, pp. 387-398), and modification of the architecture of the macromolecule, i.e., the linkage of the monomer branches.

Accordingly, one preferred embodiment of the method also makes use, during or after the reaction of the monomers $A_2$ and $B_3$, of a monomer C acting as chain extender.

Examples of suitable chain-extending monomers C are the abovementioned diamines or higher-functionality amines, which react with the carboxy groups of different polymer branches and thus bond them. Particularly suitable compounds are isophoronediamine, ethylenediamine, 1,2-diaminopropane, 1,3-diaminopropane, N-methylethylenediamine, piperazine, tetramethylenediamine (1,4-diaminobutane), N,N'-dimethylethylenediamine, N-ethylethylenediamine, 1,5-diaminopentane, 1,3-diamino-2,2-diethylpropane, 1,3-bis(methylamino)propane, hexamethylenediamine (1,6-diaminohexane), 1,5-diamino-2-methylpentane, 3-(propylamino)propylamine, N,N'-bis(3-aminopropyl)piperazine, N,N'-bis(3-aminopropyl)piperazine and isophoronediamine (IPDA).

Amino acids of the general formula $H_2N$—R—COOH are also suitable as chain extenders C, R here being an organic radical.

The amount of the chain extenders C depends in the usual way on the desired gel point or the desired architecture of the macromolecule. The amount of the chain extenders C is generally from 0.1% to 50% by weight, preferably from 0.5 to 40% by weight, and in particular from 1% to 30% by weight, based on the entirety of the monomers $A_2$ and $B_3$ used.

To prepare functionalized polyamides, concomitant use is made of monofunctional comonomers D, which may be added prior to, during or after the reaction of the monomers $A_2$ and $B_3$. This method gives a polymer chemically modified by the comonomer units and their functional groups.

One preferred embodiment of the method therefore makes use, prior to, during, or after the reaction of the monomers $A_2$ and $B_3$, of a comonomer D having a functional group, giving a modified polyamide.

Examples of these comonomers D are saturated or unsaturated monocarboxylic acids, including fatty acids, and their anhydrides or esters. Examples of suitable acids are acetic acid, propionic acid, butyric acid, valeric acid, isobutyric acid, trimethylacetic acid, caproic acid, caprylic acid, heptanoic acid, capric acid, pelargonic acid, lauric acid, myristic acid, palmitic acid, montanic acid, stearic acid, isostearic acid, nonanoic acid, 2-ethylhexanoic acid, benzoic acid, and unsaturated monocarboxylic acids, such as methacrylic acid, and also the anhydrides and esters, such as acrylic esters or methacrylic esters, of the monocarboxylic acids mentioned.

Examples of suitable unsaturated fatty acids D are oleic acid, ricinoleic acid, linoleic acid, linolenic acid, erucic acid, and fatty acids derived from soy, linseed, castor oil, and sunflower.

Particularly suitable carboxylic esters D are methyl methacrylate, hydroxyethyl methacrylate, and hydroxypropyl methacrylate.

Other comonomers D which may be used are alcohols, including fatty alcohols, e.g., glycerol monolaurate, glycerol monostearate, ethylene glycol monomethyl ether, the polyethylene monomethyl ethers, benzyl alcohol, 1-dodecanol, 1-tetradecanol, 1-hexadecanol, and unsaturated fatty alcohols.

Other suitable comonomers D are acrylates, in particular alkyl acrylates, such as n-butyl acrylate, isobutyl acrylate, tert-butyl acrylate, lauryl acrylate, stearyl acrylate, or hydroxyalkyl acrylates, such as hydroxyethyl acrylate, hydroxypropyl acrylate, and the hydroxybutyl acrylates. The acrylates may be introduced in a particularly simple manner into the polymer via Michael addition at the amino groups of the hyperbranched polyamide.

The amount of the comonomers D depends in the usual way on the extent to which the polymer is to be modified. The amount of the comonomers D is generally from 0.5% to 40% by weight, preferably 1% to 35% by weight, based on the entirety of the monomers $A_2$ and $B_3$ used.

Depending on the nature and amount of the monomers used, and on the reaction conditions, the hyperbranched polyamide may have terminal carboxy groups (—COOH) or terminal amino groups (—NH, —NH$_2$), or both. The selection of the comonomer D added for functionalization depends in the usual way on the nature and number of the terminal groups with which D reacts. If carboxy end groups are to be modified, it is preferable to use from 0.5 to 2.5, preferably from 0.6 to 2, and particularly preferably from 0.7 to 1.5, molar equivalents of an amine, e.g. of a mono- or diamine, and in particular of a triamine having primary or secondary amino groups, per mole of carboxy end groups.

If amino end groups are to be modified, it is preferable to use from 0.5 to 2.5, preferably from 0.6 to 2, and particularly preferably from 0.7 to 1.5, molar equivalents of a monocarboxylic acid per mole of amino end groups.

As mentioned, Michael addition may also be used to react amino end groups with the acrylates mentioned, the number of acrylate molar equivalents used for this purpose preferably being from 0.5 to 2.5, in particular from 0.6 to 2, and more preferably from 0.7 to 1.5, per mole of amino end groups.

The number of free COOH groups in (acid number of) the final polyamide product is generally from 0 to 400, preferably from 0 to 200, mg KOH per gram of polymer and may be determined, for example, via titration to DIN 53240-2.

The monomers $A_2$ are generally reacted with the monomers $B_3$ at an elevated temperature, for example at from 80 to 180° C., in particular from 90 to 160° C. It is preferable to operate under an inert gas, e.g. nitrogen, or in vacuo, in the presence or absence of a solvent, such as water, 1,4-dioxane, dimethylformamide (DMF), or dimethylacetamide (DMAC). Examples of solvent mixtures with good suitability are those composed of water and 1,4-dioxane. However, there is no need to use a solvent; by way of example, the carboxylic acid may be used as initial charge and melted, and the amine may be added to the melt. The water of reaction formed during the course of the polymerization (polycondensation) is, by way of example, drawn off in vacuo or is removed via azeotropic distillation, using suitable solvents, such as toluene.

The pressure is generally non-critical, being from 1 mbar to 100 bar absolute, for example. If no solvent is used, the water of reaction can be removed in a simple manner by operating in vacuo, e.g., at from 1 to 500 mbar.

The reaction time is usually from 5 minutes to 48 hours, preferably from 30 minutes to 24 hours, and more preferably from 1 hour to 10 hours.

The reaction of carboxylic acid and amine may take place in the absence or presence of catalysts. Examples of suitable catalysts are the amidation catalysts mentioned at a later stage below.

If use is also made of catalysts, their amount is usually from 1 to 5000 ppm by weight, preferably from 10 to 1000 ppm by weight, based on the entirety of the monomers $A_2$ and $B_3$.

During or after the polymerization process, the chain extenders C mentioned may be added, if desired. For chemical modification of the hyperbranched polyamide it is also possible to add the comonomers D mentioned, prior to, during, or after the polymerization process.

The reaction of the comonomers D may be catalyzed via conventional amidation catalysts, if required. Examples of these catalysts are ammonium phosphate, triphenyl phosphite, or dicyclohexylcarbodiimide. In particular when using heat-sensitive comonomers D, and when using methacrylates or fatty alcohols as comonomer D, the reaction may also be catalyzed via enzymes, operations usually being carried out at from 40 to 90° C., preferably from 50 to 85° C., and in particular 55 to 80° C., and in the presence of a free-radical inhibitor.

Free-radical polymerization and also unwanted crosslinking reactions of unsaturated functional groups are inhibited by the inhibitor and, if appropriate, by operating under an inert gas. Examples of these inhibitors are hydroquinone, the monomethyl ether of hydroquinone, phenothiazine, derivatives of phenol, e.g., 2-tert-butyl-4-methylphenol, 6-tert-butyl-2,4-dimethylphenol, or N-oxyl compounds, such as N-oxyl-4-hydroxy-2,2,6,6-tetramethylpiperidine (hydroxy-TEMPO), N-oxyl-4-oxo-2,2,6,6-tetramethylpiperidine (TEMPO), in amounts of from 50 to 2000 ppm by weight, based on the entirety of the monomers $A_2$ and $B_3$.

The preparation is carried out preferably batchwise, or else possibly continuously, for example in stirred vessels, tubular reactors, tower reactors, or other conventional reactors, which may have static or dynamic mixers, and conventional apparatus for pressure control and temperature control and also for operations under an inert gas.

In the case of operation without solvent, the final product is generally obtained directly and, if necessary, can be purified via conventional purification operations. If use has been made of a solvent, it may be removed in the usual way from the reaction mixture after the reaction, for example via vacuum distillation.

The inventive method features great simplicity. It permits the preparation of hyperbranched polyamides in a simple one-pot reaction. There is no need for isolation or purification of intermediates or protective groups for intermediates. The method has economic advantages, because the monomers are commercially available and inexpensive

Hyperbranched Polyesteramides

Suitable hyperbranched polyesteramides can be prepared by reacting a carboxylic acid having at least two carboxyl groups with an amino alcohol which has at least one amino group and at least two hydroxyl groups.

The process starts from a carboxylic acid having at least two carboxy groups (dicarboxylic acid, tricarboxylic acid or carboxylic acid of higher functionality) and from an amino alcohol (alkanolamine) having at least one amino group and having two hydroxyl groups.

Suitable carboxylic acids usually have from 2 to 4, in particular 2 or 3 carboxy groups, and have an alkyl, aryl, or arylalkyl radical having from 1 to 30 C atoms. Carboxylic acids contemplated include all di-, tri-, and tetracarboxylic acids already stated for the hyperbranched polyamides, and the derivatives of these acids.

The carboxylic acid used is more preferably succinic acid, glutaric acid, adipic acid, 1,2-, 1,3- or 1,4-cyclohexanedicarboxylic acid, phthalic acid, isophthalic acid, terephthalic acid, or dimethyl esters thereof. Succinic acid and adipic acid are very particularly preferred.

Preferred suitable amino alcohols (alkanolamines) having at least one amino group and at least two hydroxy groups are dialkanolamines and trialkanolamines. Examples of dialkanolamines which may be used are those of the formula 1

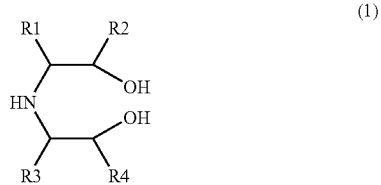
(1)

where R1, R2, R3 and R4 independently of one another, are hydrogen, $C_{1-6}$ alkyl, $C_{3-12}$ cycloalkyl or $C_{6-14}$ aryl (incl. arylalkyl).

Examples of suitable dialkanolamines are diethanolamine, dipropanolamine, diisopropanolamine, 2-amino-1,3-propanediol, 3-amino-1,2-propanediol, 2-amino-1,3-propanediol, dibutanolamine, diisobutanolamine, bis(2-hydroxy-1-butyl)amine, bis(2-hydroxy-1-propyl)amine and dicyclohexanolamine.

Suitable trialkanolamines are those of the formula 2

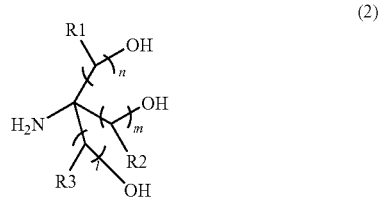
(2)

where R1, R2 and R3 are as defined for formula 1, and l, m and n, independently of one another, are whole numbers from 1 to 12. By way of example, tris(hydroxymethyl)aminomethane is suitable.

The amino alcohol used preferably comprises diethanolamine (DEA) and diisopropanolamine (DIPA).

In one preferred process the carboxylic acid used comprises a dicarboxylic acid and the amino alcohol used comprises an alcohol having one amino group and two hydroxy groups.

The process can also be used to prepare functionalized polyesteramides. For this, use is made of comonomers C as well, and these may be added prior to, during, or after the reaction of carboxylic acid, amino alcohol, and, if appropriate, monomer M. This gives a polymer chemically modified by the comonomer units and their functional groups.

One preferred embodiment of the process is therefore one wherein, prior to, during, or after the reaction of carboxylic acid, amino alcohol and, if appropriate, monomer M, use is made of a comonomer C as well, giving a modified polyesteramide. The comonomer may comprise one, two, or more than two functional groups.

Suitable comonomers C are the saturated and unsaturated monocarboxylic acids, including fatty acids, their anhydrides and esters, alcohols, acrylates and also the abovementioned monofunctional or higher-functionality alcohols (among which are diols and polyols), amines (among which are diamines and triamines), and amino alcohols (alkanolamines), as stated for the hyperbranched polyamides before.

The amount of the comonomers C depends in the usual way on the extent to which the polymer is to be modified. The amount of the comonomers C is generally 0.5% to 40% by weight, preferably 1% to 35% by weight, based on the entirety of the amino alcohol and carboxylic acid monomers used.

The number of free OH groups in (hydroxyl number of) the final polyesteramide product is generally from 10 to 500, preferably from 20 to 450, mg KOH per gram of polymer, and can be determined, by way of example, via titration to DIN 53240-2.

The number of free COOH groups in (acid number of) the final polyesteramide product is generally from 0 to 400, preferably from 0 to 200, mg KOH per gram of polymer, and can likewise be determined via titration to DIN 53240-2.

The reaction of the carboxylic acid with the amino alcohol generally takes place at an elevated temperature, for example at from 80 to 250° C., in particular at from 90 to 220° C., and particularly preferably at from 95 to 180° C. If for purposes of modification the polymer is reacted with comonomers C and catalysts are used for this purpose (see a later stage below), the reaction temperature may be adapted to take account of the catalyst used, operations being generally carried out at from 90 to 200° C., preferably from 100 to 190° C., and in particular from 110 to 180° C.

Operations are preferably carried out under an inert gas, e.g., nitrogen, or in vacuo, in the presence or absence of a solvent, such as 1,4-dioxane, dimethylformamide (DMF), or dimethylacetamide (DMAc). However, there is no requirement to use a solvent; by way of example, the carboxylic acid may be mixed with the amino alcohol and—if appropriate in the presence of a catalyst—reacted at an elevated temperature. The water of reaction formed in the course of the polymerization (polycondensation) process is, by way of example, drawn off in vacuo or removed via azeotropic distillation, using suitable solvents, such as toluene.

The end of the reaction of carboxylic acid and amino alcohol can often be discerned from a sudden rapid rise in the viscosity of the reaction mixture. When the viscosity begins to rise, the reaction may be terminated, for example by cooling. A specimen of the mixture may then be used to determine the number of carboxy groups in the (pre)polymer, for example via titration to give the acid number to DIN 53402-2, and then, if appropriate, the monomer M and/or comonomer C may be added and reacted.

The pressure is generally not critical and, by way of example, is from 1 mbar to 100 bar absolute. If no solvent is used, the water of reaction can be removed in a simple manner by operating in vacuo, e.g., at from 1 to 500 mbar absolute. The reaction time is usually from 5 minutes to 48 hours, preferably from 30 minutes to 24 hours, and more preferably from 1 hour to 10 hours.

As mentioned, the comonomers C mentioned may be added prior to, during, or after the polymerization process, in order to achieve chemical modification of the hyperbranched polyesteramide.

The process may use a catalyst which catalyzes the reaction of the carboxylic acid with the amino alcohol (esterification).

Suitable catalysts are acidic, preferably inorganic catalysts, organometallic catalysts, or enzymes.

Examples of acidic inorganic catalysts which may be mentioned are sulfuric acid, phosphoric acid, phosphonic acid, hypophosphorous acid, aluminum sulfate hydrate, alum, acidic silica gel (pH$\leqq$6, in particular $\leqq$5), and acidic aluminum oxide. Other examples of acidic inorganic catalysts which may be used are aluminum compounds of the general formula $Al(OR)_3$ and titanates of the general formula $Ti(OR)_4$. Examples of preferred acidic organometallic catalysts are those selected from dialkyltin oxides $R_2SnO$, where R is as defined above. One particularly preferred representative of acidic organometallic catalysts is di-n-butyltin oxide, commercially available as "oxotin". An example of a suitable material is Fascat® 4201, a di-n-butyltin oxide from Atofina.

Preferred acidic organic catalysts are acidic organic compounds having, by way of example, phosphate groups, sulfonic acid groups, sulfate groups, or phosphonic acid groups. Particular preference is given to sulfonic acids, such as para-toluenesulfonic acid. It is also possible to use acidic ion exchangers as acidic organic catalysts, an example being polystyrene resins which contain sulfonic acid groups and which have been crosslinked with about 2 mol % of divinylbenzene.

If use is made of a catalyst, its amount is usually from 1 to 5000 ppm by weight, preferably from 10 to 1000 ppm by weight, based on the entirety of carboxylic acid and amino alcohol.

Specifically, the reaction of the comonomers C can also be catalyzed via conventional amidation catalysts, usually operating at from 40 to 90° C., preferably from 50 to 85° C., and in particular from 55 to 80° C., and in the presence of a free-radical inhibitor.

The inventive process may preferably be carried out batchwise, or else continuously, for example in stirred vessels, tubular reactors, tower reactors, or other conventional reactors, which may have static or dynamic mixers and conventional apparatus for pressure control and temperature control and also for operations under an inert gas.

In the case of operation without solvent, the final product is generally obtained directly and, if necessary, can be purified via conventional purification operations. If concomitant use has been made of a solvent, this may be removed in the usual way from the reaction mixture after the reaction, for example via vacuum distillation.

The hyperbranched polymers described above may additionally be subjected to polymer-analogous reaction. In this way it is possible to adapt their properties even more effectively, in certain circumstances, to their use in various dispersions. For polymer-analogous reaction it is possible to subject functional groups originally present in the polymer (e.g., A or B groups) to reaction, such that the resulting polymers contain at least one new functionality.

The polymer-analogous reaction of the hyperbranched polymers may take place during the preparation of the polymers, immediately after the polymerization reaction, or in a separate reaction step.

If, before or during polymer synthesis, components are added that as well as A and B groups contain further functional groups, the product is a hyperbranched polymer in which these further functional groups are distributed substantially at random.

Compounds used for the transfunctionalization may comprise firstly the desired functional group for new introduction, and also a second group that is capable of reacting with the B groups of the hyperbranched polymer starting material used, to form a bond. One example of this is the reaction of an isocyanate group with a hydroxycarboxylic acid or with an aminocarboxylic acid, to form an acid functionality, or the reaction of an OH group with acrylic anhydride, to form a reactive acrylic double bond.

Examples of suitable functional groups that can be introduced by means of suitable reaction partners comprise, in particular, acidic or basic groups containing H atoms, and the derivatives of such groups, such as —OC(O)OR, —COOH, —COOR, —CONHR, —CONH$_2$, —OH, —SH, —NH$_2$, —NHR, —NR$_2$, —SO$_3$H, —SO$_3$R, —NHCOOR, —NH-CONH$_2$, —NHCONHR, etc. If appropriate it is also possible to convert ionizable functional groups into the corresponding salts by means of suitable acids or bases. A further possibility is to subject primary, secondary or tertiary amino groups to quaternization, with alkyl halides or dialkyl sulfates, for example. This procedure can be used, for example, to obtain water-soluble or water-dispersible hyperbranched polymers.

The radicals R of said groups are preferably straight-chain or branched, unsubstituted or substituted, alkyl radicals. For example they are $C_1$-$C_{30}$ alkyl radicals or $C_6$-$C_{14}$ aryl radicals. Examples of suitable functional groups are —CN or —OR$^a$, with R$^a$=H or alkyl.

For the use of the hyperbranched polymers in dispersions it may be advantageous for hydrophilic and hydrophobic moieties to have a particular proportion to one another. Hydrophobicization of a hyperbranched polymer can be accomplished, for example, by using monofunctional hydrophobic compounds, with which reactive groups present are modified before, during or after the polymerization. Thus, for example, the polymers of the invention can be hydrophobicized by reaction with monofunctional, saturated or unsaturated aliphatic or aromatic amines, alcohols, carboxylic acids, epoxides or isocyanates.

Additionally it is also possible, for example, to incorporate difunctional or higher polyfunctional monomers containing hydrophobic groups by copolymerization during the molecular weight build-up. For this purpose it is possible, for example, to use difunctional or higher polyfunctional alcohols, amines, isocyanates, carboxylic acids and/or epoxides, which in addition to the reactive groups also carry aromatic radicals or long-chain alkane, alkene or akyne radicals.

Examples of monomers of this kind are alcohols, such as glycerol monostearate, glycerol monooleate, hexanediol, octanediol, decanediol, dodecanediol, octadecanediol, dimer fatty alcohos, amines, such as hexamethylenediamine, octanediamine, dodecanediamine, isocyanates, such as aromatic or aliphatic di- and polyisocyanates, e.g., diphenylmethane diisocyanate and its higher-oligomer species, tolylene diisocyanate, naphthylene diisocyanate, xylylene diisocyanate, hexamethylene diisocyanate, hexamethylene diisocyanate trimers, isophorone diisocyanate, bis(diisocyanatocyclohexyl)methane or bis(isocyanatomethyl)cyclohexane, and acids, such as adipic acid, octanedioic acid, dodecanedioic acids, octadecanedioic acid or dimer fatty acids.

The hyperbranched polymers used in accordance with the invention may also be hydrophilicized. This can be done, for example, by converting hyperbranched polymers comprising hydroxyl groups and/or primary or secondary amino groups into high-functionality polymer polyols by reaction with alkylene oxides, such as ethylene oxide, propylene oxide, butylene oxide or mixtures thereof. For the alkoxylation it is preferred to use ethylene oxide. As a further option, however, alkylene oxide alcohols or alkylene oxide amines with a functionality of two or more can be used as synthesis components during the preparation of the hyperbranched polymers.

It is also possible to generate hyperbranched polymers which have different functionalities. This can be accomplished, for example, through reaction with a mixture of different compounds for the transfunctionalization, or else by reacting only some of the functional groups originally present.

It is further possible to generate compounds of mixed functionality by using monomers of type ABC or $AB_2C$ for the polymerization, C representing a functional group which is not reactive with A or B under the chosen reaction conditions.
Polymer Dispersion PD)

The polymer dispersion PD) is prepared using at least one ethylenically unsaturated monomer (M). The monomer (M) comprises $\alpha,\beta$-ethylenically unsaturated monomers, which for the purpose of the invention comprehends monomers having a terminal double bond. The monomer (M) is preferably selected from esters of $\alpha,\beta$-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, monoethylenically unsaturated carboxylic and sulfonic acids, phosphorus monomers, esters of $\alpha,\beta$-ethylenically unsaturated monocarboxylic and dicarboxylic acids with $C_2$-$C_{30}$ alkanediols, amides of $\alpha,\beta$-ethylenically unsaturated monocarboxylic and dicarboxylic acids with $C_2$-$C_{30}$ amino alcohols which contain a primary or secondary amino group, primary amides of $\alpha,\beta$-ethylenically unsaturated monocarboxylic acids and their N-alkyl and N,N-dialkyl derivatives, N-vinyllactams, open-chain N-vinylamide compounds, esters of allyl alcohol with $C_1$-$C_{30}$ monocarboxylic acids, esters of $\alpha,\beta$-ethylenically unsaturated monocarboxylic and dicarboxylic acids with amino alcohols, amides of $\alpha,\beta$-ethylenically unsaturated monocarboxylic and dicarboxylic acids with diamines which contain at least one primary or secondary amino group, N,N-diallylamines, N,N-diallyl-N-alkylamines, vinyl- and allyl-substituted nitrogen heterocycles, vinyl ethers, $C_2$-$C_8$-monoolefins, nonaromatic hydrocarbons having at least two conjugated double bonds, polyether (meth)acrylates, monomers containing urea groups, and mixtures thereof.

Suitable esters of $\alpha,\beta$-ethylenically unsaturated monocarboxylic and dicarboxylic acids with $C_1$-$C_{20}$ alkanols are methyl(meth)acrylate, methyl ethacrylate, ethyl (meth)acrylate, ethyl ethacrylate, n-propyl (meth)acrylate, isopropyl (meth)acrylate, n-butyl (meth)acrylate, sec-butyl (meth)acrylate, tert-butyl (meth)acrylate, tert-butyl ethacrylate, n-hexyl (meth)acrylate, n-heptyl (meth)acrylate, n-octyl (meth)acrylate, 1,1,3,3-tetramethylbutyl (meth)acrylate, ethylhexyl (meth)acrylate, n-nonyl (meth)acrylate, n-decyl (meth)acrylate, n-undecyl (meth)acrylate, tridecyl (meth)acrylate, myristyl (meth)acrylate, pentadecyl (meth)acrylate, palmityl (meth)acrylate, heptadecyl (meth)acrylate, nonadecyl (meth) acrylate, arachinyl (meth)acrylate, behenyl (meth)acrylate, lignoceryl (meth)acrylate, cerotinyl (meth)acrylate, melissinyl (meth)acrylate, palmitoleyl (meth)acrylate, oleyl (meth) acrylate, linolyl (meth)acrylate, linolenyl (meth)acrylate, stearyl (meth)acrylate, lauryl (meth)acrylate, and mixtures thereof.

Preferred vinylaromatics are styrene, 2-methylstyrene, 4-methylstyrene, 2-(n-butyl)styrene, 4-(n-butyl)styrene, 4-(n-decyl)styrene, and, with particular preference, styrene.

Suitable esters of vinyl alcohol with $C_1$-$C_{30}$ monocarboxylic acids are, for example, vinyl formate, vinyl acetate, vinyl propionate, vinyl butyrate, vinyl laurate, vinyl stearate, vinyl propionate, versatic acid vinyl esters, and mixtures thereof.

Suitable ethylenically unsaturated nitriles are acrylonitrile, methacrylonitrile, and mixtures thereof.

Suitable vinyl halides and vinylidene halides are vinyl chloride, vinylidene chloride, vinyl fluoride, vinylidene fluoride, and mixtures thereof.

Suitable ethylenically unsaturated carboxylic acids, sulfonic acids, and phosphonic acids or their derivatives are acrylic acid, methacrylic acid, ethacrylic acid, $\alpha$-chloroacrylic acid, crotonic acid, maleic acid, maleic anhydride, itaconic acid, citraconic acid, mesaconic acid, glutaconic acid, aconitic acid, fumaric acid, the monoesters of monoethylenically unsaturated dicarboxylic acids having 4 to 10, preferably 4 to 6, C atoms, e.g., monomethyl maleate, vinylsulfonic acid, allylsulfonic acid, sulfoethyl acrylate, sulfoethyl methacrylate, sulfopropyl acrylate, sulfopropyl methacrylate, 2-hydroxy-3-acryloyloxypropylsulfonic acid, 2-hydroxy-3-methacryloyloxypropylsulfonic acid, styrenesulfonic acids, and 2-acrylamido-2-methylpropanesulfonic acid. Suitable styrenesulfonic acids and derivates thereof are styrene-4-sulfonic acid and styrene-3-sulfonic acids and the alkali metal or alkaline earth metal salts thereof, such as sodium styrene-3-sulfonate and sodium styrene-4-sulfonate, for example. Particularly preferred are acrylic acid, methacrylic acid, and mixtures thereof.

Examples of phosphorous monomers are vinylphosphonic acid and allylphosphonic acid, for example. Also suitable are the monoesters and diesters of phosphonic acid and phosphoric acid with hydroxyalkyl (meth)acrylates, especially the monoesters. Additionally suitable are diesters of phosphonic acid and phosphoric acid that have been esterified once with hydroxyalkyl (meth)acrylate and also once with a different alcohol, such as an alkanol, for example. Suitable hydroxyalkyl (meth)acrylates for these esters are those specified below as separate monomers, more particularly 2-hydroxyethyl(meth)acrylate, 3-hydroxypropyl (meth)acrylate, 4-hydroxybutyl (meth)acrylate, etc. Corresponding dihydrogen phosphate ester monomers comprise phosphoalkyl (meth) acrylates, such as 2-phosphoethyl (meth)acrylate, 2-phosphopropyl (meth)acrylate, 3-phosphopropyl (meth)acrylate, phosphobutyl (meth)acrylate, and 3-phospho-2-hydroxypropyl (meth)acrylate. Also suitable are the esters of phosphonic acid and phosphoric acid with alkoxylated hydroxyalkyl (meth)acrylates, examples being the ethylene oxide condensates of (meth)acrylates, such as $H_2C=C(H,CH_3)COO(CH_2CH_2O)_nP(OH)_2$ and $H_2C=C(H,CH_3)COO(CH_2CH_2O)_nP(=O)(OH)_2$, in which n is 1 to 50. Of further suitability are phosphoalkyl crotonates, phosphoalkyl maleates, phosphoalkyl fumarates, phosphodialkyl (meth)acrylates, phosphodialkyl crotonates and allyl phosphates. Further suitable monomers containing phosphorus groups are described in WO 99/25780 and U.S. Pat. No. 4,733,005, hereby incorporated by reference.

Suitable esters of $\alpha,\beta$-ethylenically unsaturated monocarboxylic and dicarboxylic acids with $C_2$-$C_{30}$ alkanediols are, for example, 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethylhexyl acrylate, 3-hydroxy-2-ethylhexyl methacrylate, etc.

Suitable primary amides of α,β-ethylenically unsaturated monocarboxylic acids and their N alkyl and N,N-dialkyl derivatives are acrylamide, methacrylamide, N-methyl(meth) acrylamide, N-ethyl(meth)acrylamide, N-propyl(meth)acrylamide, N-(n-butyl)(meth)acrylamide, N-(tert-butyl)(meth) acrylamide, N-(n-octyl)(meth)acrylamide, N-(1,1,3,3-tetramethylbutyl)(meth)acrylamide, N-ethylhexyl(meth) acrylamide, N-(n-nonyl)(meth)acrylamide, N-(n-decyl) (meth)acrylamide, N-(n-undecyl)(meth)acrylamide, N-tridecyl(meth)acrylamide, N-myristyl(meth)acrylamide, N-pentadecyl(meth)acrylamide, N-palmityl(meth)acrylamide, N-heptadecyl(meth)acrylamide, N-nonadecyl(meth) acrylamide, N-araquinyl(meth)acrylamide, N-behenyl (meth)acrylamide, N-lignoceryl(meth)acrylamide, N-cerotinyl(meth)acrylamide, N-melissinyl(meth)acrylamide, N-palmitoleyl(meth)acrylamide, N-oleyl(meth)acrylamide, N-linolyl(meth)acrylamide, N-linolenyl(meth)acrylamide, N-stearyl(meth)acrylamide, N-lauryl(meth) acrylamide, N,N-dimethyl(meth)acrylamide, N,N-diethyl (meth)acrylamide, morpholinyl(meth)acrylamide.

Suitable N-vinyllactams and their derivatives are, for example, N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam, N-vinyl-7-ethyl-2-caprolactam, etc.

Suitable open-chain N-vinylamide compounds are, for example, N-vinylformamide, N-vinyl-N-methylformamide, N-vinylacetamide, N-vinyl-N-methylacetamide, N-vinyl-N-ethylacetamide, N-vinylpropionamide, N-vinyl-N-methylpropionamide and N-vinylbutyramide.

Suitable esters of α,β-ethylenically unsaturated monocarboxylic and dicarboxylic acids with amino alcohols are N,N-dimethylaminomethyl(meth)acrylate, N,N-dimethylaminoethyl(meth)acrylate, N,N-diethylaminoethylacrylate, N,N-dimethylaminopropyl (meth)acrylate, N,N-diethylaminopropyl (meth)acrylate and N,N-dimethylaminocyclohexyl (meth)acrylate.

Suitable amides of α,β-ethylenically unsaturated monocarboxylic and dicarboxylic acids with diamines which contain at least one primary or secondary amino group are N-[2-(dimethylamino)ethyl]acrylamide, N-[2-(dimethylamino) ethyl]methacrylamide, N-[3-(dimethylamino)propyl] acrylamide, N-[3-(dimethylamino)propyl]methacrylamide, N-[4-(dimethylamino)butyl]acrylamide, N-[4-(dimethylamino)-butyl]methacrylamide, N-[2-(diethylamino)ethyl] acrylamide, N-[4-(dimethylamino)cyclohexyl]acrylamide, N-[4-(dimethylamino)cyclohexyl]methacrylamide, etc.

Suitable monomers M) are, furthermore, N,N-diallylamines and N,N-diallyl-N-alkylamines and their acid addition salts and quaternization products. Alkyl here is preferably $C_1$-$C_{24}$ alkyl. Preference is given to N,N-diallyl-N-methylamine and to N,N-diallyl-N,N-dimethylammonium compounds, such as the chlorides and bromides, for example.

Further suitable monomers M) are vinyl- and allyl-substituted nitrogen heterocycles, such as N-vinylimidazole, N-vinyl-2-methylimidazole, and vinyl- and allyl-substituted heteroaromatic compounds, such as 2- and 4-vinylpyridine, 2- and 4-allylpyridine, and the salts thereof.

Suitable $C_2$-$C_8$ monoolefins and nonaromatic hydrocarbons having at least two conjugated double bonds are ethylene, propylene, isobutylene, isoprene, butadiene, etc.

Suitable polyether (meth)acrylates are compounds of the general formula (A)

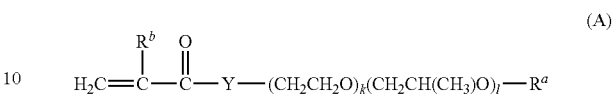

in which
the sequence of the alkylene oxide units is arbitrary,
k and l independently of one another are an integer from 0 to 100, the sum of k and l being at least 3,
$R^a$ is hydrogen, $C_1$-$C_{30}$ alkyl, $C_5$-$C_8$ cycloalkyl, $C_6$-$C_{14}$-aryl or ($C_6$-$C_{14}$-)aryl-($C_1$-$C_4$-)alkyl,
$R^b$ is hydrogen or $C_1$-$C_8$ alkyl,
Y is O or $NR^c$, where $R^c$ is hydrogen, $C_1$-$C_{30}$ alkyl or $C_5$-$C_8$ cycloalkyl.

Preferably k is an integer from 1 to 100, more preferably from 3 to 50, more particularly 4 to 25. Preferably l is an integer from 0 to 100, more preferably from 3 to 50, more particularly 4 to 25.

The sum of k and l is preferably from 3 to 200, more particularly from 4 to 100.

Preferably $R^a$ in the formula (A) is hydrogen or $C_1$-$C_{18}$-alkyl, such as methyl, ethyl, n-propyl, isopropyl, n-butyl, sec-butyl, n-pentyl, n-hexyl, octyl, 2-ethylhexyl, decyl, lauryl, palmityl or stearyl.

Preferably $R^b$ is hydrogen or $C_1$-$C_6$-alkyl, such as methyl, ethyl, n-propyl, isopropyl, n-butyl, sec-butyl, tert-butyl, n-pentyl or n-hexyl, more particularly hydrogen, methyl or ethyl. With particular preference $R^b$ is hydrogen or methyl.

Preferably Y in the formula (A) is O or NH, especially O.

Examples of suitable polyether (meth)acrylates are the polycondensation products of the aforementioned α,β-ethylenically unsaturated monocarboxylic and/or dicarboxylic acids and their acid chlorides, acid amides, and acid anhydrides with polyetherols. Suitable polyetherols are readily preparable by reaction of ethylene oxide, 1,2-propylene oxide and/or epichlorohydrin with a starter molecule, such as water or short-chain alcohol $R^a$—OH. The alkylene oxides can be used individually, in alternation in succession or as a mixture. The polyether acrylates can be used alone or in mixtures for preparing the emulsion polymers employed in accordance with the invention.

The polymer dispersion PD) preferably comprises in copolymerized form at least one polyether (meth)acrylate selected from the compounds of the general formulae I or II or mixtures thereof

in which
n is an integer from 3 to 15, preferably 4 to 12,
$R^a$ is hydrogen, $C_1$-$C_{20}$ alkyl, $C_5$-$C_8$ cycloalkyl or $C_6$-$C_{14}$ aryl,
$R^b$ is hydrogen or methyl.

Suitable polyether (meth)acrylates are available commercially, in the form for example of various products designated Bisomer® from Laporte Performance Chemicals, UK. They include, for example, Bisomer MPEG 350 MA, a methoxy-polyethylene glycol monomethacrylate.

Examples of suitable monomers containing urea groups are N-vinylurea or N-allylurea or derivatives of imidazolidin-2-one. They include N-vinyl- and N-allylimidazolidin-2-one, N-vinyl oxyethylimidazolidin-2-one, N-(2-(meth)acrylamidoethyl)imidazolidin-2-one, N-(2-(meth)acryloxyethyl)imidazolidin-2-one (i.e., 2-ureido (meth)acrylate), N-[2-((meth)acryloxyacetamido)ethyl]imidazolidin-2-one, etc.

Preferred monomers containing urea groups are N-(2-acryloxyethyl)imidazolidin-2-one and N-(2-methacryloxyethyl)imidazolidin-2-one. Particular preference is given to N-(2-methacryloxyethyl)imidazolidin-2-one (2-ureidomethacrylate, UMA).

The aforementioned monomers M) may be used individually, in the form of mixtures within one class of monomer, or in the form of mixtures from different classes of monomer.

For the emulsion polymerization it is preferred to use at least 40%, more preferably at least 60%, and more particularly at least 80% by weight, based on the total weight of the monomers M), and at least one monomer M1) selected from esters of α,β-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, and mixtures thereof (principal monomers). Preferably the monomers M1) are used for the emulsion polymerization in an amount of up to 99.9%, more preferably up to 99.5%, more particularly up to 99%, by weight, based on the total weight of the monomers M).

The principal monomers M1) are preferably selected from methyl(meth)acrylate, ethyl(meth)acrylate, n-propyl (meth)acrylate, isopropyl (meth)acrylate, n-butyl (meth)acrylate, sec-butyl (meth)acrylate, tert-butyl (meth)acrylate, n-pentyl (meth)acrylate, n-hexyl (meth)acrylate, n-heptyl (meth)acrylate, n-octyl (meth)acrylate, 2-ethylhexyl (meth)acrylate, styrene, 2-methylstyrene, vinyl acetate, acrylonitrile, methacrylonitrile, and mixtures thereof.

In addition to at least one principal monomer M1) it is also possible in the free-radical emulsion polymerization for the preparation of PD) to use at least one further monomer M2), which is generally present in a minority amount (secondary monomers). For the emulsion polymerization it is preferred to use up to 60%, more preferably up to 40%, and more particularly up to 20% by weight, based on the total weight of the monomers M), of at least one monomer M2) selected from ethylenically unsaturated monocarboxylic and dicarboxylic acids and the anhydrides and monoesters of ethylenically unsaturated dicarboxylic acids, ethylenically unsaturated sulfonic acids, (meth)acrylamides, $C_1$-$C_{10}$ hydroxyalkyl (meth)acrylates, $C_1$-$C_{10}$ hydroxyalkyl(meth)acrylamides, and mixtures thereof. Preferably the monomers M2), when present, are used for the emulsion polymerization in an amount of at least 0.01%, more preferably at least 0.05% by weight, more particularly at least 0.1%, by weight, especially at least 0.5% by weight, more especially at least 1% by weight, based on the total weight of the monomers M).

For the emulsion polymerization it is particularly preferred to use 0.1% to 60%, preferably 0.5% to 40%, more particularly 1% to 20% by weight of at least one monomer M2). The monomers M2) in a first version comprise at least one monomer which carries acid groups and is preferably selected from monoethylenically unsaturated $C_3$-$C_8$ monocarboxylic acids, monoethylenically unsaturated $C_4$-$C_8$ dicarboxylic acids, their anhydrides and monoesters, monoethylenically unsaturated sulfonic acids and mixtures thereof. The fraction of monomers M2) which carry acid groups (if such monomers are present) is preferably 0.05% to 15% by weight, more preferably 0.1% to 10% by weight, based on the total weight of the monomers M). In a second version the monomers M2) comprise at least one neutral, monoethylenically unsaturated monomer which is preferably selected from amides of monoethylenically unsaturated $C_3$-$C_8$ monocarboxylic acids, hydroxy-$C_2$-$C_4$ alkyl esters of monoethylenically unsaturated $C_3$-$C_8$ monocarboxylic acids, and mixtures thereof. The fraction of neutral monomers M2) (if such monomers are present) is preferably 0.01% to 15% by weight, more preferably 0.1% to 10% by weight, based on the total weight of the monomers M). In a third version, the monomers M2) comprise a mixture of at least one monomer which carries acid groups and at least one neutral, monoethylenically unsaturated monomer. The sum of these monomers M2) is preferably 0.1% to 20% by weight, more preferably 0.5% to 15% by weight, based on the total weight of the monomers M). The monomers M2) are especially selected from acrylic acid, methacrylic acid, itaconic acid, maleic acid, fumaric acid, maleic anhydride, acrylamide, methacrylamide, 2-hydroxyethyl acrylate, 2-hydroxyethyl methacrylate, 2-hydroxyethylacrylamide, 2-hydroxyethylmethacrylamide, and mixtures thereof.

Examples of particularly suitable combinations of principal monomers M1) for the methods of the invention are as follows:
n-butyl acrylate, methyl methacrylate;
n-butyl acrylate, methylmethacrylate, styrene;
n-butyl acrylate, styrene;
n-butyl acrylate, ethylhexyl acrylate;
n-butyl acrylate, ethylhexyl acrylate, styrene.

The aforementioned particularly suitable combinations of principal monomers M1) can be combined with particularly suitable monomers M2), which are preferably selected from acrylic acid, methacrylic acid, acrylamide, methacrylamide, and mixtures thereof.

In one specific embodiment the free-radical emulsion polymerization for the preparation of PD) is carried out using at least one polyether (meth)acrylate in addition to M1) and, if present, M2). This polyether (meth)acrylate is used preferably in an amount of up to 25% by weight, more preferably up to 20% by weight, based on the total weight of the monomers M). For the emulsion polymerization it is particularly preferred to use 0.1% to 20% by weight, preferably 1% to 15% by weight, of at least one polyether (meth)acrylate. Suitable polyether (meth)acrylates are those mentioned above. Preferably the polyether (meth)acrylate is selected from compounds of the general formulae I or II or mixtures thereof

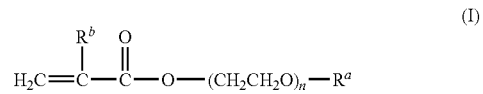

(I)

(II)

in which
n is an integer from 3 to 15, preferably 4 to 12,
$R^a$ is hydrogen, $C_1$-$C_{20}$ alkyl, $C_5$-$C_8$ cycloalkyl or $C_6$-$C_{14}$ aryl,
$R^b$ is hydrogen or methyl.

In one specific embodiment the free-radical emulsion polymerization for the preparation of PD) is carried out using at least one monomer containing urea groups, in addition to M1) and, if present, M2) and/or polyether (meth)acrylates. This urea-functional monomer is used preferably in an amount of up to 25% by weight, more preferably up to 20% by weight, based on the total weight of the monomers M). For the emulsion polymerization it is particularly preferred to use 0.1% up to 20% by weight, more particularly 1% to 15% by weight, of at least one monomer containing urea groups. Suitable monomers containing urea groups are those specified above. In the preparation of the polymer dispersions of the invention it is possible to use at least one crosslinker in addition to the aforementioned monomers M). Monomers which possess a crosslinking function are compounds having at least two polymerizable, ethylenically unsaturated, nonconjugated double bonds in the molecule. Crosslinking may also take place, for example, through photochemical activation. For that purpose it is possible to prepare PD) additionally using at least one monomer containing photoactivable groups. Photoinitiators can also be added separately. Crosslinking can also be accomplished, for example, by means of functional groups which are able to enter into a chemical crosslinking reaction with complementary functional groups. In that case the complementary groups may both be attached to the emulsion polymer. For the crosslinking it is possible to use a crosslinker which is capable of being able to enter into a chemical crosslinking reaction with functional groups of the emulsion polymer.

Suitable crosslinkers are, for example, acrylic esters, methacrylic esters, allyl ethers or vinyl ethers of at least dihydric alcohols. The OH groups of the parent alcohols may be wholly or partly etherified or esterified; the crosslinkers, however, comprise at least two ethylenically unsaturated groups.

Examples of the parent alcohols are dihydric alcohols such as 1,2-ethanediol, 1,2-propanediol, 1,3-propanediol, 1,2-butanediol, 1,3-butanediol, 2,3-butanediol, 1,4-butanediol, but-2-ene-1,4-diol, 1,2-pentanediol, 1,5-pentanediol, 1,2-hexanediol, 1,6-hexanediol, 1,10-decanediol, 1,2-dodecanediol, 1,12-dodecanediol, neopentyl glycol, 3-methylpentane-1,5-diol, 2,5-dimethyl-1,3-hexanediol, 2,2,4-trimethyl-1,3-pentanediol, 1,2-cyclohexanediol, 1,4-cyclohexanediol, 1,4-bis(hydroxymethyl)cyclohexane, hydroxypivalic acid neopentyl glycol monoester, 2,2-bis(4-hydroxyphenyl)propane, 2,2-bis[4-(2-hydroxypropyl)phenyl]propane, diethylene glycol, triethylene glycol, tetraethylene glycol, dipropylene glycol, tripropylene glycol, tetrapropylene glycol, 3-thiapentane-1,5-diol, and also polyethylene glycols, polypropylene glycols, and polytetrahydrofurans having molecular weights of in each case 200 to 10 000. Besides the homopolymers of ethylene oxide or propylene oxide it is also possible to use block copolymers of ethylene oxide or propylene oxide, or copolymers which incorporate ethylene oxide and propylene oxide groups. Examples of parent alcohols having more than two OH groups are trimethylolpropane, glycerol, pentaerythritol, 1,2,5-pentanetriol, 1,2,6-hexanetriol, cyanuric acid, sorbitan, sugars such as sucrose, glucose, and mannose. The polyhydric alcohols can of course also be used, following reaction with ethylene oxide or propylene oxide, in the form of the corresponding ethoxylates or propoxylates. The polyhydric alcohols can also first be converted to the corresponding glycidyl ethers by reaction with epichlorohydrin.

Additional suitable crosslinkers are the vinyl esters or the esters of monohydric, unsaturated alcohols with ethylenically unsaturated $C_3$-$C_6$ carboxylic acids, examples being acrylic acid, methacrylic acid, itaconic acid, maleic acid or fumaric acid. Examples of such alcohols are allyl alcohol, 1-buten-3-ol, 5-hexen-1-ol, 1-octen-3-ol, 9-decen-1-ol, dicyclopentenyl alcohol, 10-undecen-1-ol, cinnamyl alcohol, citronellol, crotyl alcohol or cis-9-octadecen-1-ol. An alternative option is to esterify the monohydric, unsaturated alcohols with polybasic carboxylic acids, examples being malonic acid, tartaric acid, trimellitic acid, phthalic acid, terephthalic acid, citric acid or succinic acid.

Other suitable crosslinkers are esters of unsaturated carboxylic acids with the above-described polyhydric alcohols, examples being those of oleic acid, crotonic acid, cinnamic acid or 10-undecenoic acid.

Suitable crosslinkers, furthermore, are straight-chain or branched, linear or cyclic, aliphatic or aromatic hydrocarbons which possess at least two double bonds, which in the case of aliphatic hydrocarbons must not be conjugated, examples being divinylbenzene, divinyltoluene, 1,7-octadiene, 1,9-decadiene, 4-vinyl-1-cyclohexene, trivinylcyclohexane or polybutadienes having molecular weights of 200 to 20 000.

Further suitable crosslinkers are the acrylamides, methacrylamides, and N-allylamines of at least difunctional amines. Such amines are, for example, 1,2-diaminoethane, 1,3-diaminopropane, 1,4-diaminobutane, 1,6-diaminohexane, 1,12-dodecanediamine, piperazine, diethylenetriamine or isophoronediamine. Likewise suitable are the amides formed from allylamine and unsaturated carboxylic acids, such as acrylic acid, methacrylic acid, itaconic acid, maleic acid, or at least dibasic carboxylic acids, of the kind described above.

Furthermore, triallylamine and triallylmonoalkylammonium salts, e.g., triallylmethylammonium chloride or triallylmethylammonium methylsulfate, are suitable as crosslinkers.

Also suitable are N-vinyl compounds of urea derivatives, at least difunctional amides, cyanurates or urethanes, such as of urea, ethyleneurea, propyleneurea or tartaramide, for example, such as N,N'-divinylethyleneurea or N,N'-divinylpropyleneurea.

Further suitable crosslinkers are divinyldioxane, tetraallylsilane or tetravinylsilane. It will be appreciated that mixtures of the aforementioned compounds can also be used. Preference is given to using water-soluble crosslinkers.

Further included among the crosslinking monomers are those which as well as an ethylenically unsaturated double bond contain a reactive functional group, such as an aldehyde group, a keto group or an oxirane group, able to react with an added crosslinker. The functional groups are preferably keto groups or aldehyde groups. The keto or aldehyde groups are preferably attached to the polymer through copolymerization of copolymerizable, ethylenically unsaturated compounds with keto or aldehyde groups. Suitable such compounds are acrolein, methacrolein, vinyl alkyl ketones having 1 to 20, preferably 1 to 10, carbon atoms in the alkyl radical, formylstyrene, (meth)acrylic acid alkyl esters having one or two keto or aldehyde groups or one aldehyde group and one keto group in the alkyl radical, the alkyl radical preferably comprising a total of 3 to 10 carbon atoms, examples being (meth)acryloxyalkylpropanals, as described in DE-A-2722097. Also suitable, furthermore, are N-oxoalkyl(meth)acrylamides of the kind known, for example, from U.S. Pat. No. 4,226,007, DE-A-2061213 or DE-A-2207209. Particularly preferred are acetoacetyl (meth)acrylate, acetoacetoxyethyl(meth)acrylate and, more particularly, diacetoneacrylamide. The crosslinkers are preferably a compound with at least two functional groups, more particularly two to five functional groups, which are able to enter into a crosslinking reaction with the functional groups of the polymer, especially the keto or aldehyde groups. Functional groups for the crosslinking of the keto or aldehyde groups include, for example, hydrazide, hydroxylamine or oxime ether or amino groups. Suitable compounds of hydrazide groups are, for example, polycarboxylic hydrazides having a molar weight of up to 500 g/mol. Particularly preferred hydrazide compounds are dicarboxylic dihydrazides having preferably 2 to 10 C atoms. Examples of such include oxalic dihydrazide, malonic dihydrazide, succinic dihydrazide, glutaric dihydrazide, adipic dihydrazide, sebacic dihydrazide, maleic dihydrazide, fumaric dihydrazide, itaconic dihydrazide and/or isophthalic dihydrazide. Of particular interest are the following: adipic dihydrazide, sebacic dihydrazide, and isophthalic dihydrazide. Suitable compounds with hydroxylamine or oxime ether groups are specified for example in WO 93/25588.

By appropriate additization of the aqueous polymer dispersion PD) it is also possible additionally to produce surface crosslinking. Such additization includes, for example, the addition of a photoinitiator, or of siccatives. Suitable photoinitiators are those which are excited by sunlight, examples being benzophenone or derivatives thereof. Suitable siccatives are the metal compounds recommended for aqueous alkyd resins, based for example on Co or Mn (overview in U. Poth, Polyester and Alkydharze, Vincentz Network 2005, p. 183 f).

The crosslinking component is used preferably in an amount of 0.0005% to 5%, more preferably 0.001% to 2.5%, more particularly 0.01% to 1.5%, by weight, based on the total weight of the monomers used for the polymerization (including the crosslinker).

In one special version the emulsion polymerization is carried out using at least 98% by weight, more preferably at least 99% by weight, more particularly at least 99.5% by weight, especially 100% by weight, of monoethylenically unsaturated compounds, based on the total weight of the compounds capable of polymerization.

One specific embodiment are polymer dispersions PD) which comprise no copolymerized crosslinker.

The free-radical polymerization of the monomer mixture M) may take place in the presence of at least one regulator. Regulators are used preferably in an amount of 0.0005% to 5%, more preferably of 0.001% to 2.5%, and more particularly of 0.01% to 1.5% by weight, based on the total weight of the monomers used for the polymerization.

Regulators (polymerization regulators) is a general term for compounds having high transfer constants. Regulators accelerate chain transfer reactions to bring about reduction in the degree of polymerization of the resultant polymers without affecting the overall reaction rate. Regulators may be subdivided into monofunctional, difunctional or polyfunctional regulators, depending on the number of functional groups in the molecule that are able to lead to one or more chain transfer reactions. Suitable regulators are described comprehensively, for example, by K. C. Berger and G. Brandrup in J. Brandrup, E. H. Immergut, Polymer Handbook, $3^{rd}$ ed., John Wiley & Sons, New York, 1989, p. II/81-II/141.

Examples of suitable regulators include aldehydes such as formaldehyde, acetaldehyde, propionaldehyde, n-butyraldehyde, and isobutyraldehyde.

Other regulators which can also be used are as follows: formic acid, its salts or esters, such as ammonium formate, 2,5-diphenyl-1-hexene, hydroxylammonium sulfate, and hydroxylammonium phosphate.

Further suitable regulators are halogen compounds, examples being alkyl halides such as tetrachloromethane, chloroform, bromotrichloromethane, bromoform, allyl bromide, and benzyl compounds such as benzyl chloride or benzyl bromide.

Further suitable regulators are allyl compounds, such as allyl alcohol, functionalized allyl ethers, such as allyl ethoxylates, alkyl allyl ethers or glycerol monoallyl ether.

As regulators it is preferred to use compounds comprising sulfur in bound form.

Examples of compounds of this kind are inorganic hydrogen sulfites, disulfites, and dithionites or organic sulfides, disulfides, polysulfides, sulfoxides, and sulfones. They include di-n-butyl sulfide, di-n-octyl sulfide, diphenyl sulfide, thiodiglycol, ethylthio-ethanol, diisopropyl disulfide, di-n-butyl disulfide, di-n-hexyl disulfide, diacetyl disulfide, diethanol sulfide, di-tert-butyl trisulfide, dimethyl sulfoxide, dialkyl sulfide, dialkyl disulfide and/or diaryl sulfide.

Suitable polymerization regulators further include thiols (compounds which acquire sulfur in the form of SH groups, also referred to as mercaptans). Preferred regulators are mono-, di-, and polyfunctional mercaptans, mercapto alcohols and/or mercapto carboxylic acids. Examples of these compounds are allyl thioglycolates, ethyl thioglycolate, cysteine, 2-mercaptoethanol, 1,3-mercaptopropanol, 3-mercaptopropane-1,2-diol, 1,4-mercaptobutanol, mercaptoacetic acid, 3-mercaptopropionic acid, mercaptosuccinic acid, thioglycerol, thioacetic acid, thiourea, and alkyl mercaptans such as n-butyl mercaptan, n-hexyl mercaptan or n-dodecylmercaptan.

Examples of difunctional regulators, comprising two sulfur atoms in bound form, are difunctional thiols such as, for example, dimercaptopropanesulfonic acid (sodium salt), dimercaptosuccinic acid, dimercapto-1-propanol, dimercaptoethane, dimercaptopropane, dimercaptobutane, dimercaptopentane, dimercaptohexane, ethylene glycol bisthioglycolates and butanediol bisthioglycolate. Examples of polyfunctional regulators are compounds which comprise more than two sulfur atoms in bound form. Examples thereof are trifunctional and tetrafunctional mercaptans.

All of the stated regulators may be used individually or in combination with one another. One specific embodiment relates to polymer dispersions PD which are prepared by free-radical emulsion polymerization with the addition of a regulator.

To prepare the polymers it is possible to polymerize the monomers with the aid of initiators that form free radicals.

As initiators for the free-radical polymerization it is possible to employ the peroxo and/or azo compounds customary for the purpose, examples being alkali metal or ammonium peroxidisulfates, diacetyl peroxide, dibenzoyl peroxide, succinyl peroxide, di-tert-butyl peroxide, tert-butyl perbenzoate, tert-butyl perpivalate, tert-butyl peroxy-2-ethylhexanoate, tert-butyl permaleate, cumene hydroperoxide, diisopropyl peroxidicarbamate, bis(o-toluoyl) peroxide, didecanoyl peroxide, dioctanoyl peroxide, dilauroyl peroxide, tert-butyl perisobutyrate, tert-butyl peracetate, di-tert-amyl peroxide, tert-butyl hydroperoxide, azobisisobutyronitrile, 2,2'-azobis (2-amidinopropane) dihydrochloride or 2-2'-azo-bis-(2-methyl-butyronitrile). Mixtures of these initiators are suitable as well.

Among the initiators that can be used are reduction/oxidation (i.e., redox) initiator systems. The redox initiator systems are composed of at least one, usually inorganic, reducing agent and one organic or inorganic oxidizing agent. The oxidizing component comprises, for example, the initiators already specified above for the emulsion polymerization. In the case of the reducing component the compound in question comprises, for example, alkali metal salts of sulfurous acid, such as sodium sulfite, sodium hydrogen sulfite, alkali metal salts of disulfurous acid such as sodium disulfite, bisulfite addition compounds of aliphatic aldehydes and ketones, such as acetone bisulfite, or reducing agents such as hydroxymethanesulfinic acid and its salts, or ascorbic acid. The redox initiator systems can be used along with soluble metal compounds whose metallic component is able to occur in a plurality of valence states. Typical redox initiator systems are, for example, ascorbic acid/iron(II) sulfate/sodium peroxodisulfate, tert-butyl hydroperoxide/sodium disulfite, tert-butyl hydroperoxide/Na hydroxymethanesulfinic acid. The individual components, the reducing component for example, may also be mixutres—for example, a mixture of sodium salt of hydroxymethanesulfinic acid with sodium disulfite.

The amount of initiators is generally 0.1% to 10% by weight, preferably 0.1% to 5% by weight, based on all of the monomers to be polymerized. It is also possible to use two or more different initiators in the emulsion polymerization.

The preparation of the polymer dispersion PD takes place typically in the presence of at least one surface-active compound. A comprehensive description of suitable protective colloids is found in Houben-Weyl, Methoden der organischen Chemie, volume XIV/1, Makromolekulare Stoffe, Georg Thieme Verlag, Stuttgart, 1961, pp. 411 to 420. Suitable emulsifiers are also found in Houben-Weyl, Methoden der organischen Chemie, volume 14/1, Makromolekulare Stoffe, Georg Thieme Verlag, Stuttgart, 1961, pages 192 to 208.

Suitable emulsifiers are anionic, cationic, and nonionic emulsifiers. As surface-active substances it is preferred to use emulsifiers, whose relative molecular weights are typically below those of protective colloids. More particularly it has proven appropriate to use exclusively anionic emulsifiers, or a combination of at least one anionic emulsifier and at least one nonionic emulsifier.

Useful nonionic emulsifiers are araliphatic or aliphatic nonionic emulsifiers, examples being ethoxylated mono-, di-, and trialkylphenols (EO degree: 3 to 50, alkyl radical: $C_4$-$C_{10}$), ethoxylates of long-chain alcohols (EO degree: 3 to 100, alkyl radical: $C_8$-$C_{36}$) and also polyethylene oxide/polypropylene oxide homopolymers and copolymers. These may comprise the alkylene oxide units copolymerized in random distribution or in the form of blocks. Highly suitable, for example, are EO/PO block copolymers. Preference is given to using ethoxylates of long-chain alkanols (alkyl radical $C_1$-$C_{30}$, average degree of ethoxylation 5 to 100) and, of these, particular preference to those having a linear $C_{12}$-$C_{20}$ alkyl radical and an average degree of ethoxylation of 10 to 50, and also ethoxylated monoalkylphenols.

Examples of suitable anionic emulsifiers are alkali metal salts and ammonium salts of alkyl sulfates (alkyl radical: $C_8$-$C_{22}$), of sulfuric monoesters with ethoxylated alkanols (EO degree: 2 to 50, alkyl radical: $C_{12}$-$C_{18}$) and with ethoxylated alkylphenols (EO degree: 3 to 50, alkyl radical: $C_4$-$C_9$), of alkylsulfonic acids (alkyl radical: $C_{12}$-$C_{18}$), and of alkylarylsulfonic acids (alkyl radical: $C_9$-$C_{18}$). Further suitable emulsifiers are found in Houben-Weyl, Methoden der organischen Chemie, volume XIV/1, Makromolekulare Stoffe, Georg-Thieme-Verlag, Stuttgart, 1961, pp. 192-208). Likewise suitable as anionic emulsifiers are bis(phenylsulfonic acid) ethers and/or their alkali metal or ammonium salts which carry a $C_4$-$C_{24}$ alkyl group on one or both aromatic rings. These compounds are general knowledge, from U.S. Pat. No. 4,269,749, for example, and are available commercially, in the form for example of Dowfax® 2A1 (Dow Chemical Company).

Suitable cationic emulsifiers are preferably quaternary ammonium halides, e.g., trimethylcetylammonium chloride, methyltrioctylammonium chloride, benzyl-triethylammonium chloride or quaternary compounds of N—$C_6$-$C_{20}$ alkylpyridines, -morpholines or -imidazoles, e.g., N-laurylpyridinium chloride.

The amount of emulsifier is generally about 0.01% to 10% by weight, preferably 0.1% to 5% by weight, based on the amount of monomers to be polymerized.

The polymer dispersions PD) may additionally be admixed with typical auxiliaries and additives. These include, for example, pH modifiers, reductants and bleaches, such as the alkali metal salts of hydroxymethane sulfinic acid (e.g., Rongalit® C from BASF Aktiengesellschaft), complexing agents, deodorants, flavors, odorants, and viscosity modifiers, such as alcohols, e.g., glycerol, methanol, ethanol, tert-butanol, glycol, etc. These auxiliaries and additives may be added to the polymer dispersions in the initial charge, in one of the feeds, or after the end of the polymerization.

The polymerization takes place in general at temperatures in a range from 0 to 150° C., preferably 20 to 100° C., more preferably 30 to 95° C. The polymerization takes place preferably under atmospheric pressure, although a polymerization under elevated pressure is also possible, such as under the autogenous pressure of the components used for the polymerization. In one suitable version the polymerization takes place in the presence of at least one inert gas, such as nitrogen or argon, for example.

The polymerization medium may be composed either of water alone or of mixtures of water and water-miscible liquids such as methanol. Preferably just water is used. The emulsion polymerization may be carried out either as a batch operation or in the form of a feed process, including staged or gradient procedures. Preference is given to the feed process, in which a portion of the polymerization batch or else a polymer seed is introduced as an initial charge and heated to the polymerization temperature, polymerization is commenced, and then the remainder of the polymerization batch, typically by way of two or more spatially separate feeds, of which one or more comprise the monomers in pure form or an emulsified form, is supplied to the polymerization zone continuously, in stages or under the superimposition of a concentration gradient, with the polymerization being maintained.

The term "seed polymer" is understood by the skilled person to be a finely divided polymer in the form of an aqueous polymer dispersion. The weight-average particle size of seed polymers (weight average, $d_{50}$) is typically below 200 nm, frequently in the range from 10 to 150 nm. The monomer compositions of the seed polymers is generally of minor importance. Suitability is possessed not only by seed polymers which are synthesized predominantly from vinylaromatic monomers and more particularly from styrene (known as styrene seed), but also by seed polymers which are synthesized predominantly from $C_1$-$C_{10}$ alkyl acrylates and/or $C_1$-$C_{10}$ alkyl methacrylates, such as from a mixture of butyl acrylate and methyl methacrylate, for example. Besides these principal monomers, which typically account for at least 80% by weight and more particularly at least 90% by weight of the seed polymer, the seed polymers may also comprise, in copolymerized form, monomers different from these, especially monomers having an increased solubility in water, examples being monomers having at least one acid function, and/or neutral monomers with an increased solubility in water. The fraction of monomers of this kind will generally not exceed 20% by weight and more particularly 10% by weight, and, if such monomers are present, the fraction is typically in the range from 0.1% to 10% by weight, based on the total amount of the constituent monomers of the seed polymer. The manner in which the initiator is added to the polymerization vessel in the course of the free-radical aqueous emulsion polymerization is known to a person of ordinary skill in the art. It can be included in its entirety in the initial charge to the polymerization vessel, or else employed in stages or continuously in accordance with the rate of its consumption in the course of the free-radical aqueous emulsion polymerization. In each case this will depend, in a manner known per se to a person of ordinary skill in the art, both on the chemical nature of the initiator system and on the polymerization temperature. Preferably a portion is included in the initial charge and the remainder is supplied to the polymerization zone in accordance with the rate of its consumption.

The dispersions that are formed in the polymerization may be subjected, following the polymerizing operation, to a physical or chemical aftertreatment. Examples of such techniques are the known techniques for residual monomer reduction, such as aftertreatment by addition of polymerization initiators or mixtures of two or more polymerization initiators at suitable temperatures; aftertreatment of the polymer solution by means of water vapor or ammonia vapor; or stripping with inert gas; or treatment of the reaction mixture with oxidizing or reducing reagents; adsorption techniques such as the adsorption of impurities on selected media such as activated carbon, for example; or an ultrafiltration, for example.

The aqueous polymer dispersion PD) typically has a solids content of 20% to 70% by weight, preferably 40% to 65% by weight, based on the polymer dispersion including added highly branched polymer. In one special version the solids content is at least 50%, more especially at least 55%, more especially still at least 58% by weight. Solids contents of at least 60% by weight or even at least 65% by weight are possible, based on the aqueous polymer dispersion including added highly branched polymer.

The glass transition temperature $T_g$ of the emulsion polymer present in the polymer dispersion is preferably less than 50° C., more preferably less than 40° C., more particularly less than 30° C.

The resulting aqueous polymer dispersion PD) can be used as it is or as a mixture with further polymers, generally film-forming polymers, as a binder composition in aqueous coating materials, such as paint or varnish mixtures.

The invention further provides a coating material in the form of an aqueous composition comprising at least one dispersion PD), as defined above, which comprises a highly branched polymer as an addition. The highly branched polymers may be added to the coating material in the form of an additive as well.

Further to the polymer dispersion PD), the binder composition of the coating material may comprise at least one further film-forming polymer. Included among such are, for example, alkyd resins. Examples of suitable alkyd resins are water-soluble alkyd resins, which preferably have a weight-average molecular weight of 5000 to 40 000. Additionally suitable are alkyd resins having a weight-average molecular weight of more than 40 000, specifically of more than 100 000. An alkyd resin is a polyester which has been esterified with drying oil, a fatty acid or the like (U. Poth, Polyester and Alkydharze, Vincentz Network 2005). Suitable water-soluble alkyd resins are alkyd resins of sufficiently high acid number, preferably in the range of 30-65 mg KOH/g. These may if appropriate be in partly or fully neutralized form. The weight-average molecular weight is preferably 8000 to 35 000 and more preferably 10 000 to 35 000.

The use of such further film-forming polymers, especially alkyd resins, which raise the VOC content of the coating materials, is not preferred. Preference is therefore given to a coating material that comprises at least one dispersion PD) and at least one highly branched polymer, but not film-forming polymer other than the emulsion polymer present in the polymer dispersion.

The binder compositions of the invention are employed preferably in aqueous coating materials. These coating materials take the form, for example, of an unpigmented system (clear varnish) or of a pigmented system. The fraction of the pigments can be described by the pigment volume concentration (PVC). The PVC describes the ratio of the volume of pigments ($V_P$) and fillers ($V_F$) to the total volume, composed of the volumes of binder ($V_B$), pigments, and fillers of a dried coating film, in percent: $PVC=(V_P+V_F)\times 100/(V_P+V_F+V_B)$. Coating materials can be divided on the basis of the PVC, for example, as follows:

| | |
|---|---|
| highly filled interior paint, wash resistant, white/matt | about 85 |
| interior paint, scrub resistant, white/matt | about 80 |
| semigloss paint, silk-matt | about 35 |
| semigloss paint, silk-gloss | about 25 |
| high-gloss paint | about 15-25 |
| exterior masonry paint, white | about 45-55 |
| clear varnish | 0 |

The invention provides further a coating material in the form of an aqueous composition, comprising:
  at least one dispersion PD) as defined above that comprises a highly branched polymer as an additive,
  if appropriate, at least one inorganic filler and/or at least one inorganic pigment,
  if appropriate, at least one typical auxiliary, and
  water.

Preference is given to a coating material comprising:
  10% to 60% by weight, based on the solids content, of at least one polymer dispersion PD) as defined above,
  10% to 70% by weight of inorganic fillers and/or inorganic pigments,
  0.1% to 20% by weight of typical auxiliaries, and
  water to 100% by weight.

The fraction of PD) as a proportion of the above coating material is based on solids, i.e., emulsion polymer and highly branched polymer(s), without water.

The coating materials of the invention, in the form of an aqueous composition, are employed preferably as coatings. One embodiment of the present invention relates to coating materials in the form of a clear varnish. Another embodiment of the present invention comprises coating materials in the form of an emulsion paint. The pigmented coating materials of the invention take the form preferably of an aqueous semigloss or high-gloss paint.

Elucidated in the text below is the composition of a typical emulsion paint. Emulsion paints comprise generally 30% to 75% and preferably 40% to 65% by weight of nonvolatile constituents. By these are meant all constituents of the preparation which are not water, but at least the total weight of binder, filler, pigment, low-volatility solvents (boiling point above 220° C.), plasticizers for example, and polymeric auxiliaries. This figure is accounted for to the extent of about
a) 3% to 90%, more particularly 10% to 60%, by weight, by the finely divided polymer dispersion PD,
b) 0% to 85%, preferably 5% to 60%, more particularly 10% to 50%, by weight, by at least one inorganic pigment,
c) 0% to 85%, more particularly 5% to 60%, by weight, by inorganic fillers, and
d) 0.1% to 40%, more particularly 0.5% to 20%, by weight, by typical auxiliaries.

The polymer dispersions of the invention are suitable more preferably for producing high-gloss emulsion paints. These paints are characterized generally by a pigment volume concentration, PVC, in the region of 12% to 30%. But the inventive polymer dispersions also particularly suit masonry paints with a PVC in the range from 30 to 65 or interior paints with a PVC in the range from 65 to 80. By the pigment volume concentration PVC is meant the ratio, multiplied by 100, of the total volume of pigments plus fillers divided by the total volume of pigments, fillers, and binder polymers; cf. Ullmann's Enzyklopädie der technischen Chemie, 4th edition, Volume 15, p. 667.

The term "pigment" is used in the context of this invention comprehensively to identify all pigments and fillers, examples being color pigments, white pigments, and inorganic fillers. These include inorganic white pigments such as titanium dioxide, preferably in the rutile form, barium sulfate, zinc oxide, zinc sulfide, basic lead carbonate, antimony trioxide, lithopones (zinc sulfide+barium sulfate), or colored pigments, examples being iron oxides, carbon black, graphite, zinc yellow, zinc green, ultramarine, manganese black, antimony black, manganese violet, Paris blue or Schweinfurt green. Besides the inorganic pigments the emulsion paints of the invention may also comprise organic color pigments, examples being sepia, gamboge, Cassel brown, toluidine red, para red, Hansa yellow, indigo, azo dyes, anthraquinonoid and indigoid dyes, and also dioxazine, quinacridone, phthalocyanine, isoindolinone, and metal complex pigments. Also suitable are synthetic white pigments with air inclusions to increase the light scattering, such as the Rhopaque® dispersions.

Suitable fillers are, for example, aluminosilicates, such as feldspars, silicates, such as kaolin, talc, mica, magnesite, alkaline earth metal carbonates, such as calcium carbonate, in the form for example of calcite or chalk, magnesium carbonate, dolomite, alkaline earth metal sulfates, such as calcium sulfate, silicon dioxide, etc. Finely divided fillers are of course preferred in coating materials. The fillers can be used as individual components. In actual practice, however, filler mixtures have proven particularly appropriate, examples being calcium carbonate/kaolin and calcium carbonate/talc. Glossy coating materials generally include only small amounts of very finely divided fillers, or comprise no fillers.

Finely divided fillers may also be used to increase the hiding power and/or to save on the use of white pigments. In order to adjust the hiding power, the hue, and the depth of color, it is preferred to use blends of color pigments and fillers.

The fraction of the pigments can be described, as described above, by the pigment volume concentration (PVC). Coating materials of the invention in the form of gloss paints, for example, have a PVC in the range from 12% to 35%, preferably 15% to 30%.

The coating material of the invention (aqueous coating material) may comprise, in addition to the polymer dispersion PD), at least one highly branched polymer as an additive, and, if appropriate, additional film-forming polymers and pigment, further auxiliaries.

The typical auxiliaries, in addition to the emulsifiers used in the polymerization, include wetting agents or dispersants, such as sodium, potassium or ammonium polyphosphates, alkali metal salts and ammonium salts of acrylic acid copolymers or maleic anhydride copolymers, polyphosphonates, such as sodium 1-hydroxyethane-1,1-diphosphonate, and salts of naphthalenesulfonic acids, more particularly their sodium salts.

Further suitable auxiliaries are flow control agents, defoamers, biocides, and thickeners. Suitable thickeners are, for example, associative thickeners, such as polyurethane thickeners. The amount of the thickener is preferably less than 1% by weight, more preferably less than 0.6% by weight, of thickener, based on solids content of the coating material.

The paints of the invention are produced in a known way by blending the components in mixing apparatus customary for the purpose. It has been found appropriate to prepare an aqueous paste or dispersion from the pigments, water, and, if appropriate, the auxiliaries, and only then to mix the polymeric binder, i.e., in general, the aqueous dispersion of the polymer, with the pigment paste or pigment dispersion.

The paints of the invention comprise generally 30% to 75% and preferably 40% to 65% by weight of nonvolatile constituents. By these are meant all constituents of the preparation which are not water, but at least the total amount of binder, pigment, and auxiliary, based on the solids content of the paint. The volatile constituents are primarily water.

Suitable paints are highly glossy paints. The gloss of the paints can be determined by DIN 67530. In this case the coating material is applied with slot width of 240 μm to a glass plate and is dried at room temperature for 72 hours. The test specimen is inserted into a calibrated reflectometer, and a determination is made, with a defined angle of incidence, of the extent to which the light return has been reflected or scattered. The reflectometer value determined as a measure of the gloss (the higher the value, the higher the gloss).

The gloss of high-gloss paints is preferably greater than 60 at 20° and greater than 80 at 60°. The reflectometer value is determined at 23° C. and is reported as a dimensionless parameter as a function of the incident angle, e.g., 40 at 20°.

The paint of the invention may be applied to substrates in a typical way, as for example by spreading, spraying, dipping, rolling, knife coating, etc.

It is used preferably as an architectural paint, i.e., for coating buildings or parts of buildings. The substrates in question may be mineral substrates such as renders, plaster or plasterboard, masonry or concrete, wood, woodbase materials, metal or paper, wallpaper for example, or plastic, PVC for example.

The paint is used preferably for internal parts of buildings, such as interior walls, internal doors, paneling, banisters, furniture, etc.

The paints of the invention feature ease of handling, good processing properties, and high hiding power. Their pollutant content is low. They have good performance properties, such as high water resistance, good wet adhesion, not least on alkyd paints, high blocking resistance, good overcoatability, and good flow on application. The equipment used is easily cleaned with water.

The invention is elucidated in more detail with reference to the following, nonlimiting examples.

EXAMPLES

I. Synthesis of Highly Branched Polymers
HBP 1: Hyperbranched Polycarbonate

A 4 l flask equipped with stirrer, gas inlet tube, internal thermometer, and reflux condenser was charged with 1417.6 g of diethyl carbonate, 2400.0 g of a triol obtained by propoxylating trimethylolpropane with on average 1.5 propylene oxide units, and 0.4 g of potassium carbonate and this initial charge was heated to about 130° C. under atmospheric pressure and under gentle nitrogen gassing. In the course of the polycondensation there was a reduction in the temperature of the reaction mixture to 105° C. over the course of 4 h, as a result of the ethanol formed as condensation product. When the boiling temperature remained constant, the reflux condenser was replaced by a distillation apparatus consisting of a 20 cm packed column, a descending condenser, and a receiver, and the ethanol was distilled off continuously. When 770 g of distillate had been removed, the reaction mixture was cooled to 100° C. and the potassium carbonate was neutralized by addition of 0.5 g of 85% strength phosphoric acid. The mixture was stirred at 100° C. for 1 h more. This was followed by stripping with nitrogen at 140° C. for about 0.5 h, during which remaining residues of volatile components were removed. Thereafter the product was cooled and analyzed. The OH number was 421 mg KOH/g; the molecular weight determined by GPC (eluent=DMAC, calibration=PMMA) were $M_n$=980 g/mol and $M_w$=1450 g/mol.

HBP 2: Hyperbranched Polycarbonate

A 4 l flask equipped with stirrer, gas inlet tube, internal thermometer, and reflux condenser was charged with 591 g of diethyl carbonate, 3350 g of a triol obtained by ethoxylating trimethylolpropane with on average 12 ethylene oxide units, and 0.5 g of potassium hydroxide and this initial charge was heated to about 140° C. under atmospheric pressure and under gentle nitrogen gassing. In the course of the polycondensation there was a reduction in the temperature of the reaction mixture to 110° C. over the course of 4 h, as a result of the ethanol formed as condensation product. When the boiling temperature remained constant, the reflux condenser was replaced by a distillation apparatus consisting of a 20 cm packed column, a descending condenser, and a receiver, and the ethanol was distilled off continuously. When 405 g of distillate had been removed, the reaction mixture was cooled to 100° C. and the potassium hydroxide was neutralized by addition of 0.5 g of 85% strength phosphoric acid. The mixture was stirred at 100° C. for 1 h more. This was followed by stripping with nitrogen at 140° C. for about 0.5 h, during which remaining residues of volatile components were removed. Thereafter the product was cooled and analyzed. The OH number was 151 mg KOH/g; the molecular weight determined by GPC (eluent=DMAC, calibration=PMMA) were $M_n$=2750 g/mol and $M_w$=5700 g/mol.

HBP 3: Hyperbranched Polycarbonate

A 4 l flask equipped with stirrer, gas inlet tube, internal thermometer, and reflux condenser was charged with 1182 g of diethyl carbonate, 2750 g of a triol obtained by ethoxylating trimethylolpropane with on average 3 ethylene oxide units, and 0.4 g of potassium carbonate and this initial charge was heated to about 140° C. under atmospheric pressure and under gentle nitrogen gassing. In the course of the polycondensation there was a reduction in the temperature of the reaction mixture to 110° C. over the course of 4 h, as a result of the ethanol formed as condensation product. When the boiling temperature remained constant, the reflux condenser was replaced by a distillation apparatus consisting of a 20 cm packed column, a descending condenser, and a receiver, and the ethanol was distilled off continuously. When 828 g of distillate had been removed, the reaction mixture was cooled to 100° C. and the potassium carbonate was neutralized by addition of 0.5 g of 85% strength phosphoric acid. The mixture was stirred at 100° C. for 1 h more. This was followed by stripping with nitrogen at 140° C. for about 0.5 h, during which remaining residues of volatile components were removed. Thereafter the product was cooled and analyzed. The OH number was 274 mg KOH/g; the molecular weight determined by GPC (eluent=DMAC, calibration=PMMA) were $M_n$=2170 g/mol and $M_w$=5400 g/mol.

II. Preparation of Polymer Dispersions

Example 1

Preparation of Dispersion 1

A polymerization vessel equipped with metering apparatus and temperature regulation was charged with the following:
Initial Charge:

| | |
|---|---|
| 528.0 g | water |
| 46.7 g | a polystyrene seed dispersion having a solids content of 33% and average particle size of 30 nm |
| 3.67 g | a 15% strength aqueous solution of sodium lauryl sulfate |

Thereafter this initial charge was heated to 85° C. with stirring. Subsequently, with this temperature maintained, 5% by weight of feed 2 was added and the mixture was stirred for 5 minutes. Thereafter feed 1 was metered in over 180 minutes, and the remainder of feed 2 in parallel over 195 minutes.
Feed 1:

| | |
|---|---|
| 543.2 g | water |
| 125.4 g | a 15% strength aqueous solution of sodium lauryl sulfate |
| 458.0 g | n-butyl acrylate |
| 399.6 g | methyl methacrylate |
| 165.1 g | styrene |
| 22.78 g | methacrylic acid |
| 21.45 g | ureidomethacrylate (N-(2-methacryloyloxyethyl)imidazolidin-2-one) |
| 33.0 g | Bisomer MPEG 350 MA (methoxypolyethylene glycol monomethacrylate from Laporte Performance Chemicals UK) |

Feed 2:

| | |
|---|---|
| 83.6 g | water |
| 4.4 g | sodium peroxodisulfate |

After the end of feed 1, 22 g of water were added; after the end of feed 2, polymerization was continued for 30 minutes and the batch was neutralized with 7.47 g of ammonia (25% strength aqueous solution). Thereafter 13.2 g of hydrogen peroxide (5% strength aqueous solution) were added and a solution of 0.557 g of ascorbic acid in 4.96 g of water was metered in over 60 minutes. Thereafter the dispersion was allowed to cool and was filtered through a 125 µm filter. This gave 2.48 kg of a 46% dispersion.

The hyperbranched polymers HBP 1 and HBP 2 were admixed to dispersion 1 as pure substances, in amounts as indicated in Tables 3 and 4.

Example 2

Preparation of Dispersion 2

A polymerization vessel equipped with metering apparatus and temperature regulation was charged with the following:
Initial Charge:

| | |
|---|---|
| 584.0 g | water |
| 56.9 g | a polystyrene seed dispersion having a solids content of 33% and an average particle size of 30 nm |
| 4.47 g | a 15% strength aqueous solution of sodium lauryl sulfate |

Thereafter this initial charge was heated to 85° C. with stirring. Subsequently, with this temperature maintained, 5% by weight of feed 2 was added and the mixture was stirred for 5 minutes. Thereafter feed 1 was metered in over 180 minutes, and the remainder of feed 2 in parallel over 195 minutes.

Feed 1:

| | |
|---|---|
| 595.6 g | water |
| 153.0 g | a 15% strength aqueous solution of sodium lauryl sulfate |
| 576.3 g | n-butyl acrylate |
| 529.6 g | methyl methacrylate |
| 207.6 g | styrene |
| 28.59 g | methacrylic acid |

Feed 2:

| | |
|---|---|
| 16.1 g | a 5% strength aqueous solution of sodium peroxodisulfate |

After the end of feed 1, 27 g of water were added; after the end of feed 2, polymerization was continued for 30 minutes and the batch was neutralized with 9.13 g of ammonia (25% strength aqueous solution). Thereafter 16.11 g of hydrogen peroxide (5% strength aqueous solution) were added and 6.71 g of a 10% strength aqueous solution of ascorbic acid were metered in over 60 minutes. Thereafter the dispersion was allowed to cool and was filtered through a 125 μm filter. This gave 2.85 kg of a 48% dispersion.

The hyperbranched polymer HBP 3 was admixed to dispersion 2 as pure substances, in amounts as indicated in Table 5.

III. Performance Examples

1. Preparation of Aqueous Paints

The individual components (for manufacturer see Table 1) were metered in the amount (parts by weight) and sequence as indicated in Table 2 with stirring using a toothed disk stirrer. After the titanium dioxide pigment had been added the speed was increased to 2000 rpm and the batch was dispersed until the pigment paste was smooth, i.e., free of lumps. Then, if necessary, it was cooled to room temperature and the remaining components were added at reduced speed. The binder of the formulation indicated in Table 2 for an aqueous coating material comprised no highly branched or hyperbranched polymer. For the inventive coating materials with hyperbranched polymers, the corresponding weight fraction of binder goes up, compensated by a corresponding reduction in the fraction of water.

TABLE 1

| Function | Name | Manufacturer |
|---|---|---|
| Dispersant | Disperbyk ® 190 (high molecular mass block copolymer with pigment-active groups) | Byk-Chemie GmbH, Wesel |
| Defoamers | Byk ® 020 (polysiloxane) | Byk-Chemie GmbH, Wesel |
| | Tego Airex ® 902W (silica-containing poly(ether-siloxane) copolymer | Tego Chemie, Essen |

TABLE 1-continued

| Function | Name | Manufacturer |
|---|---|---|
| Titanium dioxide pigment | Kronos ® 2190 | Kronos Titan GmbH, Leverkusen |
| Thickeners | DSX 2000 and DSX 1514 (polyurethane-based associative thickeners) | Cognis Deutschland GmbH & Co. KG, Düsseldorf |

TABLE 2

Formulation of the aqueous coating materials

| Component | Name | Amount [g] |
|---|---|---|
| Water | | 10.72 |
| Defoamer | Byk ® 020 | 0.96 |
| Dispersant | Disperbyk ® 190 | 4.7 |
| Thickeners | DSX 2000/1514 (1:0.3) | 2.46 |
| Titanium dioxide pigment | Kronos ® 2190 | 47.16 |
| Paste | | 66 |
| Water | | 7.7 |
| Solvent | Propylene glycol | 4.36 |
| Defoamer | Tego Airex ® 902W | 0.04 |
| Binder | | 121.9 |
| Total | | 200.09 |

2. Testing of aqueous paints (coating materials)

The gloss of the coating material was determined in accordance with DIN EN ISO 2813: the coating material is applied with a slot width of 240 μm to a glass plate and dried at room temperature for 72 hours. The test specimen is inserted into a calibrated haze-gloss reflectometer (Byk-Gardner, Geretsried) and the reflectometer value at 20° and 60° incident angle, and also the haze, are read off. The reflectometer value determined is a measure of the gloss (the higher the value, the higher the gloss).

TABLE 3

Addition of hyperbranched polymer HBP 1 to acrylate dispersion 1:

| | Acrylate dispersion 1 blended with different amounts of HBP 1 Fraction* | | | |
|---|---|---|---|---|
| | 0% | 1% | 2.5% | 5% |
| Gloss (60°) | 77.5 | 78.8 | 84 | 89.4 |
| Gloss (20°) | 52.2 | 60.7 | 66.9 | 78.2 |
| Haze | 187 | 129 | 105 | 25.5 |

*Weight percent based on dispersion solids

TABLE 4

Addition of hyperbranched polymer HBP 2 to acrylate dispersion 1:

| | Acrylate dispersion 1 blended with different amounts of HBP 2 Fraction* | | | |
|---|---|---|---|---|
| | 0% | 1% | 2.5% | 5% |
| Gloss (60°) | 77.5 | 80.5 | 84.4 | 85.1 |
| Gloss (20°) | 52.2 | 59.7 | 66.3 | 71.9 |
| Haze | 187 | 126 | 99.3 | 34.2 |

*Weight percent based on dispersion solids

As the fraction of hyperbranched polymer goes up there is a rise in the gloss and a fall in the haze.

TABLE 5

Addition of hyperbranched polymer HBP 3 to acrylate dispersion 2

| | Acrylate dispersion 2 blended with HBP 3 Fraction* in % by weight, based on dispersion solids | |
|---|---|---|
| | 0% | 5% |
| Gloss (20°) | 41 | 67 |
| Gloss (60°) | 79 | 88 |
| Haze | 113 | 70 |

The invention claimed is:

1. A method of producing a coating with increased gloss comprising applying to a substrate an aqueous coating material which comprises an aqueous polymer dispersion and a highly branched polymer;
wherein the highly branched polymer is at least one hyperbranched polymer which has a degree of branching of 10% to 95%.

2. The method according to claim 1, wherein the highly branched polymer is at least one selected from the group consisting of polycarbonates, polyesters, polyethers, polyurethanes, polyureas, polyamines, polyamides, poly(ureaurethanes), poly(etheramines), poly(esteramines), poly(etheramides), poly(esteramides), poly(amidoamines), poly(estercarbonates), poly(ethercarbonates), poly(etheresters), poly(etherestercarbonates), and mixtures thereof.

3. The method according to claim 1, wherein the highly branched polymer is a hyperbranched polycarbonate, poly(ethercarbonate), poly(estercarbonate) or poly(etherestercarbonate) or a mixture of hyperbranched polymers which comprises at least one hyperbranched polycarbonate, poly(ethercarbonate), poly(estercarbonate) or poly(etherestercarbonate).

4. The method according to claim 1, wherein the highly branched polymer is a hyperbranched polyester of $A_2B_3$ type.

5. The method according to claim 1, wherein the aqueous polymer dispersion comprises 0.1% to 15% by weight, based on the total weight of the polymer dispersion, of at least one highly branched polymer.

6. The method according to claim 1, wherein the aqueous polymer dispersion is obtained by free-radical emulsion polymerization of at least one ethylenically unsaturated monomer.

7. The method according to claim 6, wherein the monomer is selected from the group consisting of esters of α,β-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, monoethylenically unsaturated carboxylic and sulfonic acids, phosphorus monomers, esters of α,β-ethylenically unsaturated monocarboxylic and dicarboxylic acids with $C_2$-$C_{30}$ alkanediols, amides of α,β-ethylenically unsaturated monocarboxylic and dicarboxylic acids with $C_2$-$C_{30}$ amino alcohols which contain a primary or secondary amino group, primary amides of α,β-ethylenically unsaturated monocarboxylic acids and their N-alkyl and N,N-dialkyl derivatives, N-vinyllactams, open-chain N-vinylamide compounds, esters of allyl alcohol with $C_1$-$C_{30}$ monocarboxylic acids, esters of α,β-ethylenically unsaturated monocarboxylic and dicarboxylic acids with amino alcohols, amides of α,β-ethylenically unsaturated monocarboxylic and dicarboxylic acids with diamines which contain at least one primary or secondary amino group, N,N-diallylamines, N,N-diallyl-N-alkylamines, vinyl- and allyl-substituted nitrogen heterocycles, vinyl ethers, $C_2$-$C_8$-monoolefins, nonaromatic hydrocarbons having at least two conjugated double bonds, polyether (meth)acrylates, monomers containing urea groups, and mixtures thereof 8. The method according to claim 6, wherein the free-radical emulsion polymerization is carried out using at least 40% by weight, based on the total weight of the monomers, of at least a first monomer selected from the group consisting of esters of α,β-ethylenically unsaturated monocarboxylic and dicarboxylic acids with $C_1$-$C_{20}$ alkanols, vinylaromatics, esters of vinyl alcohol with $C_1$-$C_{30}$ monocarboxylic acids, ethylenically unsaturated nitriles, vinyl halides, vinylidene halides, and mixtures thereof 9. The method according to claim 8, wherein the free-radical emulsion polymerization is carried out additionally using up to 60% by weight, based on the total weight of the monomers, of at least a second monomer selected from the group consisting of ethylenically unsaturated monocarboxylic and dicarboxylic acids and the anhydrides and monoesters of ethylenically unsaturated dicarboxylic acids, (meth)acrylamides, $C_1$-$C_{10}$ hydroxyalkyl (meth)acrylates, $C_1$-$C_{10}$ hydroxyalkyl(meth)acrylamides, and mixtures thereof.

10. The method according to claim 8, wherein the free-radical emulsion polymerization is carried out additionally using up to 25% by weight, based on the total weight of the monomers, of at least one polyether (meth)acrylate.

11. The method according to claim 10, wherein the polyether (meth)acrylate is represented by formulae I or II or mixtures thereof

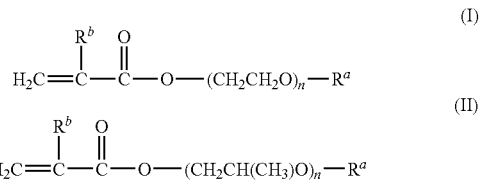

in which
n is an integer from 3 to 15;
$R^a$ is hydrogen, $C_1$-$C_{20}$ alkyl, $C_5$-$C_8$ cycloalkyl or $C_6$-$C_{14}$ aryl; and
$R^b$ is hydrogen or methyl.

12. The method according to claim 8, wherein the free-radical emulsion polymerization is carried out additionally using up to 25% by weight, based on the total weight of the monomers, of at least one monomer containing urea groups.

13. A coating material in the form of an aqueous composition comprising:
at least one aqueous polymer dispersion as defined in claim 1, comprising a highly branched polymer as an additive;
optionally at least one inorganic filler and/or at least one inorganic pigment;
optionally at least one auxiliary; and
water.

14. A transparent varnish comprising the coating material according to claim 13.

15. An emulsion paint comprising the coating material according to claim 13.

16. The emulsion paint according to claim 15, comprising:
10% to 60% by weight of at least one aqueous polymer dispersion which comprises a highly branched polymer as an additive;
10% to 70% by weight of inorganic fillers and/or inorganic pigments;
0.1% to 20% by weight of auxiliaries; and
water to 100% by weight.

17. An aqueous semigloss or high-gloss paint comprising the emulsion paint according to claim 15.

18. A high-gloss paint comprising the emulsion paint according to claim 15 having a gloss of greater than 60 at 20° incident angle.

19. A high-gloss paint comprising the emulsion paint according to claim 15 having a gloss of greater than 80 at 60° incident angle.

20. A high-gloss paint comprising the emulsion paint according to claim 15 having a pigment volume concentration in the range from 12 to 35%.

21. The method according to claim 1, wherein the aqueous polymer dispersion comprises 0.5% to 10% by weight, based on the total weight of the polymer dispersion, of the highly branched polymer.

22. The method according to claim 1, wherein the aqueous polymer dispersion comprises 1% to 5% by weight, based on the total weight of the polymer dispersion, of the highly branched polymer.

* * * * *